(12) United States Patent
Takami

(10) Patent No.: US 10,466,875 B2
(45) Date of Patent: Nov. 5, 2019

(54) INFORMATION PROCESSING DEVICE, INFORMATION PROCESSING METHOD, INFORMATION PROCESSING PROGRAM, AND RECORDING MEDIUM IN WHICH INFORMATION PROCESSING PROGRAM IS RECORDED

(75) Inventor: Shinya Takami, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 229 days.

(21) Appl. No.: 14/119,227

(22) PCT Filed: Jan. 27, 2012

(86) PCT No.: PCT/JP2012/051788
§ 371 (c)(1),
(2), (4) Date: Nov. 21, 2013

(87) PCT Pub. No.: WO2012/164965
PCT Pub. Date: Dec. 6, 2012

(65) Prior Publication Data
US 2014/0189558 A1    Jul. 3, 2014

(30) Foreign Application Priority Data
May 31, 2011   (JP) .................................. 2011-121896

(51) Int. Cl.
*G06F 3/0481*   (2013.01)
*G06F 3/0484*   (2013.01)
(Continued)

(52) U.S. Cl.
CPC ........ *G06F 3/04842* (2013.01); *G06F 3/0481* (2013.01); *G06F 3/0485* (2013.01);
(Continued)

(58) Field of Classification Search
CPC .. G06F 3/0485; G06F 3/04842; G06F 3/0481; G06F 3/0482; G06Q 30/02;
(Continued)

(56) References Cited

U.S. PATENT DOCUMENTS 7,716,597 B2    5/2010   Plow et al.
2001/0056370 A1*  12/2001  Tafla ..................... G06F 3/0481
705/14.69
(Continued)

FOREIGN PATENT DOCUMENTS

JP    04-060589 A   2/1992
JP    10-198335 A   7/1998
(Continued)

OTHER PUBLICATIONS

Akio Kasai, Web Creators The movement and decoration design that web stands out, The floating menu follows scroll, MdN Corporation, Jan. 1, 2010, No. 97, p. 053.
(Continued)

*Primary Examiner* — Tuyetlien T Tran
(74) *Attorney, Agent, or Firm* — Sughrue Mion, PLLC

(57) ABSTRACT

Provided are a device and a method which facilitate continued focusing of a user on specific content information even when said specific content information has been moved off the display screen by scrolling or page transitioning. Focus content information, which is identified from content information displayed on the display screen of the terminal device, is set in advance as content information for user focus. Then, in response to user operations which transition said focus content information out of the display area, copy content information, being a copy of said focus content information, is displayed for a certain period of time on the display screen of said terminal device.

24 Claims, 11 Drawing Sheets

(51) Int. Cl.
*G06F 3/0485* (2013.01)
*G06F 3/0486* (2013.01)
*G06Q 30/06* (2012.01)
*G06Q 30/08* (2012.01)

(52) U.S. Cl.
CPC ....... *G06F 3/0486* (2013.01); *G06Q 30/0601* (2013.01); *G06Q 30/08* (2013.01)

(58) Field of Classification Search
CPC ........... G06Q 30/0241; G06Q 30/0251; G06Q 30/0253; G06Q 30/0256; G06Q 30/0272; G06Q 30/0273; G06Q 30/0277; G06Q 30/0601; G06Q 30/08
See application file for complete search history.

(56) References Cited

U.S. PATENT DOCUMENTS

| | | | |
|---|---|---|---|
| 2002/0169790 A1* | 11/2002 | Lee | H04H 20/76 |
| 2003/0128234 A1* | 7/2003 | Brown | G06F 3/14 |
| | | | 715/744 |
| 2005/0081164 A1* | 4/2005 | Hama | G06F 3/0482 |
| | | | 715/830 |
| 2005/0216857 A1 | 9/2005 | Harako et al. | |
| 2005/0228814 A1* | 10/2005 | Plow | G06F 3/0485 |
| 2006/0123183 A1* | 6/2006 | Koivisto | G06F 3/0485 |
| | | | 711/1 |
| 2007/0209018 A1* | 9/2007 | Lindemann | G06F 3/04855 |
| | | | 715/784 |
| 2008/0147632 A1* | 6/2008 | Couch | G06F 17/30646 |
| 2008/0220747 A1* | 9/2008 | Ashkenazi | G06Q 30/02 |
| | | | 455/414.1 |
| 2009/0106687 A1* | 4/2009 | De Souza Sana | G06F 3/0481 |
| | | | 715/784 |
| 2009/0240672 A1* | 9/2009 | Costello | G06Q 30/02 |
| 2010/0235085 A1* | 9/2010 | Kikuchi | G01C 21/367 |
| | | | 701/533 |
| 2010/0251166 A1 | 9/2010 | Matsui et al. | |
| 2010/0283800 A1* | 11/2010 | Cragun | G06F 3/0481 |
| | | | 345/661 |
| 2011/0007096 A1 | 1/2011 | Miyano | |
| 2011/0202837 A1* | 8/2011 | Fong | G06F 3/0485 |
| | | | 715/702 |
| 2011/0202847 A1* | 8/2011 | Dimitrov | G06F 3/0481 |
| | | | 715/738 |
| 2012/0054656 A1* | 3/2012 | Nurmi | G06F 3/0482 |
| | | | 715/769 |
| 2012/0066627 A1* | 3/2012 | Furukawa | G06F 3/0488 |
| | | | 715/768 |
| 2012/0323680 A1* | 12/2012 | Zhou | G06F 17/30905 |
| | | | 705/14.49 |
| 2013/0326398 A1* | 12/2013 | Zuverink | G06F 3/048 |
| | | | 715/784 |

FOREIGN PATENT DOCUMENTS

| | | |
|---|---|---|
| JP | 2005-275721 A | 10/2005 |
| JP | 2007-531128 A | 11/2007 |
| JP | 2009-288119 A | 12/2009 |
| JP | 2010237777 A | 10/2010 |
| WO | 03041405 A | 5/2003 |
| WO | 2009/099074 A1 | 8/2009 |

OTHER PUBLICATIONS

International Search Report of PCT/JP2012/051788 dated May 1, 2012.

* cited by examiner

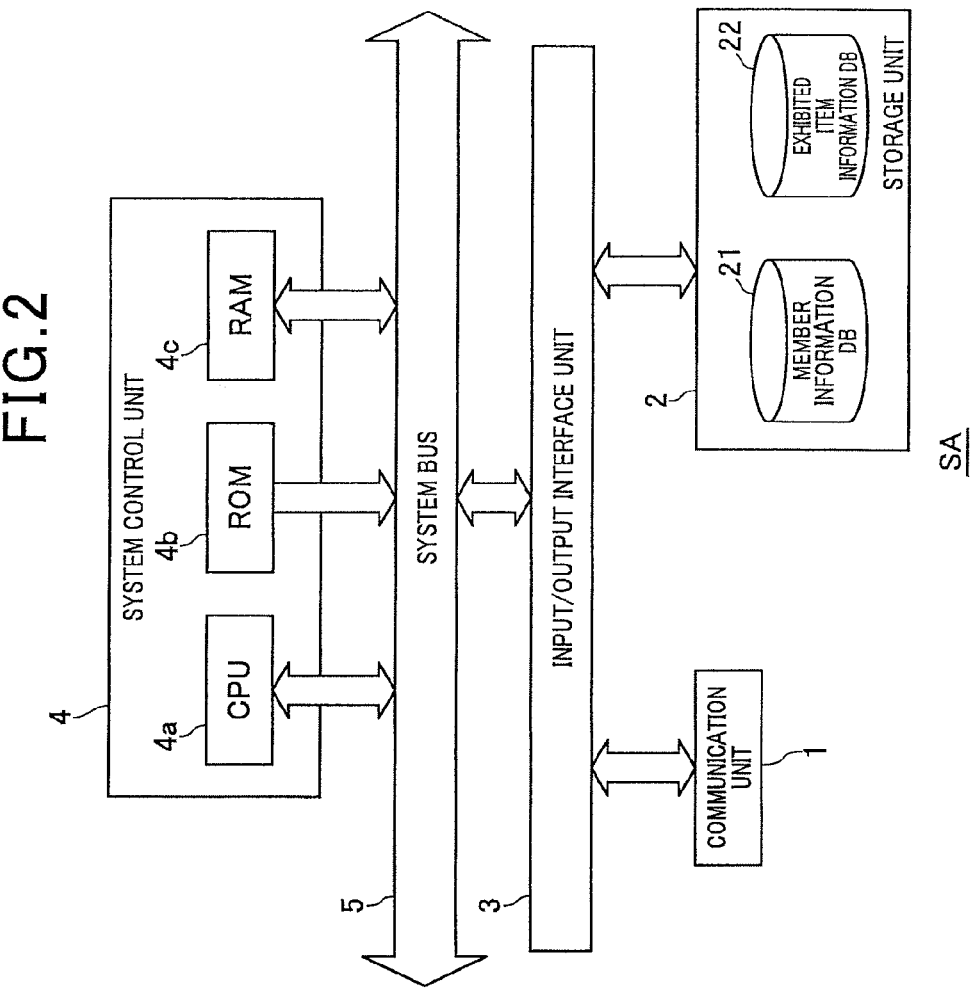

FIG.3

| MEMBER INFORMATION DB |
|---|
| MEMBER ID |
| NICKNAME |
| NAME OR TITLE |
| ADDRESS |
| PHONE NUMBER |
| EMAIL ADDRESS |
| ........ |

— 21

(A)

| EXHIBITED ITEM INFORMATION DB | |
|---|---|
| MEMBER ID OF EXHIBITOR | |
| NICKNAME OR NAME OF EXHIBITOR | |
| EXHIBITED ITEM INFORMATION | EXHIBITED ITEM ID |
| | NAME OF ITEM FOR SALE |
| | DESCRIPTION OF ITEM FOR SALE |
| | IMAGE DATA OF ITEM FOR SALE |
| | PRICE OF ITEM FOR SALE |
| | ....... |
| PRESENCE OR ABSENCE OF ATTENTION SETTING | |
| ....... | |

— 22

(B)

COPY CONTENT INFORMATION DISPLAY PROCESS ACCORDING TO EXAMPLE 1

| | ARRANGEMENT : | NORMAL | PRICE IS LOW | PRICE IS HIGH | SORT BY DATE | MANY COMMENTS |
|---|---|---|---|---|---|---|

71

NARROWING CONDITION: ☐IN-STOCK ☐INCLUDING SHIPPING COST ☒CARD OK ☐APPLICABLE TO GIFT ☐THERE ARE COMMENTS

1ST ITEM ~ 100TH ITEM (TOTAL OF 350 ITEMS)   NEXT 100 ITEMS 1 | 2 | 3 — 81

| SEARCH KEYWORD | ITEM FOR SALE IMAGE | ITEM FOR SALE NAME | PRICE | EXHIBITOR NAME | ... | |
|---|---|---|---|---|---|---|
| | | AAA SNEAKERS Free | 1,000 YEN | A SHOP | .... | ←51 |
| SEARCH FOR ITEM FOR SALE | | BBB SNEAKERS WHITE | 800 YEN | B SHOP | ... | ←52 |
| | | SHOES | 200 YEN | C SHOP | .... | ←53 |
| | | SANDALS | 800 YEN | A SHOP | .... | ←54 |
| | | AAA SNEAKERS RED | 1,000 YEN | D SHOP | .... | ←55 |
| | | CCC SNEAKERS | 5,000 YEN | E SHOP | .... | ←56 |
| | | BOOTS | 6,700 YEN | F SHOP | .... | ←57 |

(B)

| | SANDALS | 800 YEN | A SHOP | .... | ←54 |
|---|---|---|---|---|---|
| | AAA SNEAKERS RED | 1,000 YEN | D SHOP | .... | ←55 |
| | CCC SNEAKERS | 5,000 YEN | E SHOP | .... | ←56 |
| | BOOTS | 6,700 YEN | F SHOP | .... | ←57 |
| | AAA SNEAKERS GREEN | 1,100 YEN | G SHOP | .... | |
| | α SNEAKERS | 800 YEN | H SHOP | .... | |
| | RUBBER BOOTS | 100 YEN | I SHOP | .... | |
| | AAA SNEAKERS RED / SANDALS | 1,000 YEN / 800 YEN | D SHOP / K SHOP | .... | ←60 |
| | BOOTS β | 3,000 YEN | A SHOP | .... | |
| SCROLLING | HIGH HEELS BB | 1,700 YEN | B SHOP | .... | |

FIG.7
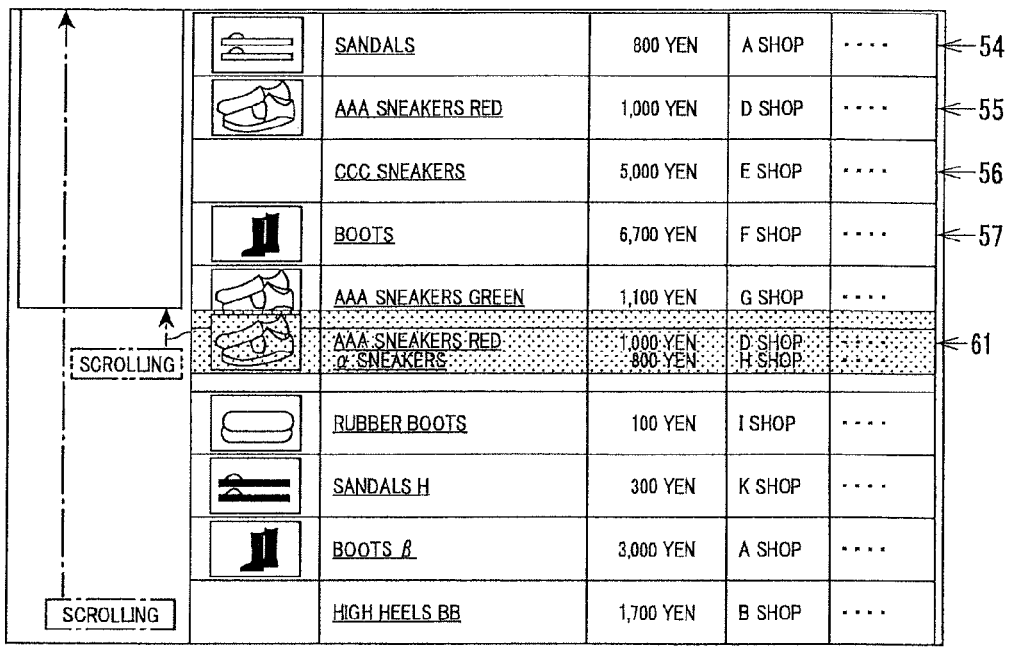
(A)
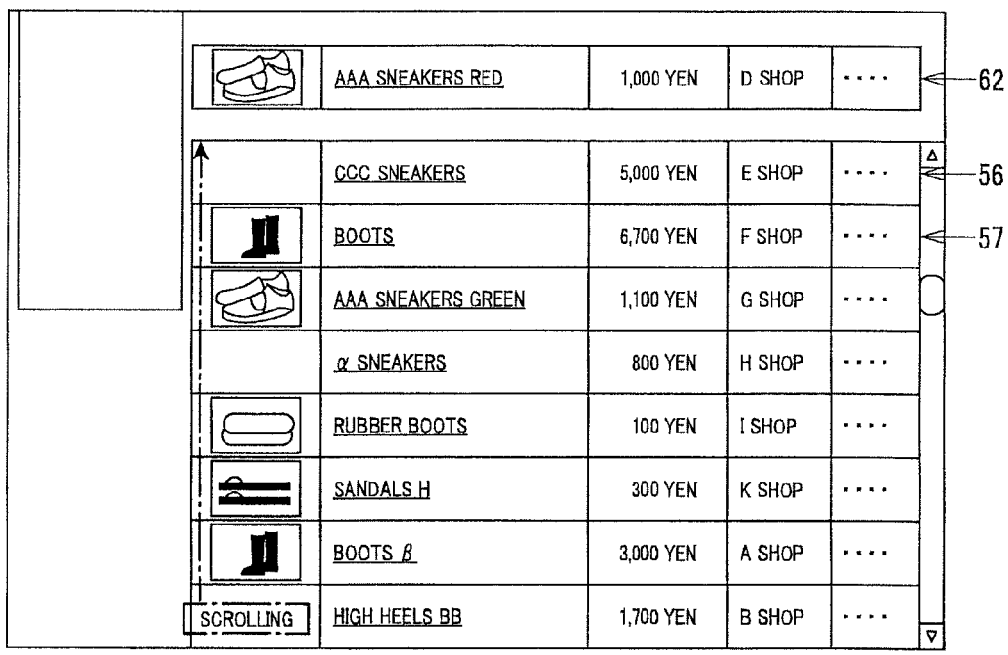
(B)

COPY CONTENT INFORMATION DISPLAY PROCESS ACCORDING TO EXAMPLE 3

INFORMATION PROCESSING DEVICE, INFORMATION PROCESSING METHOD, INFORMATION PROCESSING PROGRAM, AND RECORDING MEDIUM IN WHICH INFORMATION PROCESSING PROGRAM IS RECORDED

CROSS REFERENCE TO RELATED APPLICATIONS

This is a National Stage of International Application No. PCT/JP2012/051788 filed Jan. 27, 2012, claiming priority based on Japanese Patent Application No. 2011-121896 filed May 31, 2011, the contents of all of which are incorporated herein by reference in their entirety.

TECHNICAL FIELD

The present invention relates to a field of a technique to cause specific content information to attract attention in a web page provided from a web site on the Internet.

BACKGROUND ART

There are a large number of web sites on the Internet and a user terminal connected to the Internet displays a web page acquired from a web site on a display screen by a web browser. A lot of content information is arranged on such a web page and content information that cannot be fully displayed on one screen can be displayed by a scroll operation or a page transition operation by a user. For example, on a web page provided from a shopping site or an auction site, a list of content information (including item for sale images, character strings of item for sale description and the like) related to each exhibited item for sale is displayed. The display content of the list is scrolled by, for example, a scroll operation.

Meanwhile, it is difficult for the user of the user terminal to determine whether or not there is content information including desired content (for example, character string) at a glance while scrolling display content of the web page. On the other hand, Patent Document 1 discloses a technique for highlighting a map element such as, for example, a municipality name when the map is scrolled. If such a technique is applied, it is assumed that the user can determine whether or not there is content information including desired content at a glance while scrolling display content of the web page.

CITATION LIST

Patent Document

Patent Document 1: Japanese Patent Application Laid-Open No. 2009-288119

SUMMARY OF INVENTION

Technical Problem to be Solved by the Invention

However, the technique disclosed in the Patent Document 1 cannot cause the user to pay attention to a character string framed out (in other words, moved out of the display screen) by scrolling. In particular, on a web page provided from a shopping site or an auction site, for example, a list of a lot of content information of as many as hundreds of pieces is displayed. Therefore, once the character string is framed out by scrolling or page transition or the like, the character string is not displayed again until the scroll direction is reversed, so that it is difficult to cause the user to pay attention to the character string.

The present invention is made in view of the above problem and the like, and an object of the present invention is to provide an information processing device, an information processing method, an information processing program, and a recording medium in which the information processing program is recorded, which can facilitate the user to continuously pay attention to (can facilitate the user to pay attention to) specific content information even in case that the specific content information is moved out of the display screen by scrolling, page transition or the like.

Solution to the Problem

In order to achieve the above described problems, an invention described in claim 1 is characterized in that an information processing device that causes content information to be displayed on a display screen of a terminal device, the information processing device comprising: an attention content information specifying means that specifies attention content information that is set in advance as content information to which a user is caused to pay attention from among the content information; and a control means that causes copy content information which is a copy of the attention content information to be displayed on the display screen according to a user operation that tries to cause the attention content information specified by the attention content information specifying means to transit out of a display area.

According to this configuration, even in case that the attention content information is moved out of the display screen in accordance with the user operation, it is possible to facilitate the user to continuously pay attention to (facilitate the user to pay attention to) the attention content information.

An invention described in claim 2 is characterized in that the information processing device according to claim 1, further comprising: a user operation detection means that detects the user operation, wherein the control means causes the copy content information to be displayed on the display screen in case that the user operation is detected by the user operation detection means.

According to this configuration, the copy content information is displayed at the timing at which the user operation is detected, so that it is possible to effectively distinguish the copy content information and facilitate the user to continuously pay attention to the attention content information.

An invention described in claim 3 is characterized in that the information processing device according to claim 1 or 2, wherein the copy content information is disposed in a second layer different from a first layer in which the attention content information is disposed on the display screen, the information processing device further comprises a display position specifying means that specifies a display position of the attention content information in the first layer when the user operation is started, and the control means disposes and fixes the copy content information at a display position which is the same as the display position specified by the display position specifying means and which is a display position in the second layer and displays the copy content information.

According to this configuration, it is possible to effectively distinguish the copy content information as a residual image of the attention content information and facilitate the user to continuously pay attention to the attention content information.

An invention described in claim 4 is characterized in that the information processing device according to claim 1 or 2, wherein the copy content information is disposed in a second layer different from a first layer in which the attention content information is disposed on the display screen, and the control means causes the copy content information to be displayed while causing the copy content information to move in the second layer.

According to this configuration, it is possible to effectively distinguish the copy content information by moving the copy content information and facilitate the user to continuously pay attention to the attention content information.

An invention described in claim 5 is characterized in that the information processing device according to claim 1 or 2, wherein the control means disposes and fixes the copy content information at a predetermined display position and causes the copy content information to be displayed.

According to this configuration, it is possible to distinguish the copy content information and facilitate the user to continuously pay attention to the attention content information.

An invention described in claim 6 is characterized in that the information processing device according to any one of claims 1 to 5, wherein the control means causes the display of the copy content information to be invisible from a user in case that the user operation is completed or a predetermined period of time has elapsed from the completion of the user operation.

According to this invention, it is possible to prevent the copy content information from being an eyesore for the user due to continuously displaying the copy content information more than necessary.

An invention described in claim 7 is characterized in that the information processing device according to claim 4, wherein the user operation is a scroll operation that causes display content including the attention content information to scroll.

An invention described in claim 8 is characterized in that the information processing device according to claim 7, wherein the control means causes the copy content information to be displayed while causing the copy content information to move in the second layer at a speed slower than that of the scrolling in the same direction as that of the scrolling.

According to this configuration, it is possible to move the copy content information of the attention content information so that the copy content information chases the scrolling attention content information. As a result, it is possible to effectively distinguish the copy content information and facilitate the user to continuously pay attention to the attention content information.

An invention described in claim 9 is characterized in that the information processing device according to claim 7 or 8, wherein the control means causes the display of the copy content information to be invisible from a user in case that a speed of the scrolling becomes smaller than or equal to a predetermined speed.

According to this configuration, it is possible to prevent the copy content information from being an eyesore for the user due to continuously displaying the copy content information more than necessary.

An invention described in claim 10 is characterized in that the information processing device according to any one of claims 7 to 9, wherein the attention content information specifying means specifies new attention content information displayed on the display screen in case that a speed of the scrolling becomes smaller than or equal to a predetermined speed, and the control means causes copy content information which is a copy of the new attention content information to be displayed on the display screen according to a user operation that tries to cause the new attention content information specified by the attention content information specifying means to transit out of the display area.

According to this configuration, even in case that the attention content information that is newly displayed when the speed of the scrolling becomes smaller than or equal to a predetermined speed is moved out of the display screen, it is possible to facilitate the user to continuously pay attention to the new attention content information.

An invention described in claim 11 is characterized in that the information processing device according to any one of claims 7 to 10, wherein a display form of the copy content information is changed according to a speed of the scrolling.

According to this configuration, the display form of the copy content changes according to the speed of the scrolling, so that it is possible to more effectively distinguish the copy content information and further facilitate the user to continuously pay attention to the attention content information.

An invention described in claim 12 is characterized in that the information processing device according to any one of claims 7 to 10, further comprising: a distance information acquisition means that acquires distance information indicating a distance from a display position of the attention content information on the display screen when the scroll operation is started to a display position of the attention content information whose position is changed according to the scroll operation, wherein the control means changes a display form of the copy content information according to the distance indicated by the distance information acquired by the distance information acquisition means.

According to this configuration, the display form of the copy content changes according to the distance by which the position of the attention content information changes, so that it is possible to more effectively distinguish the copy content information and further facilitate the user to continuously pay attention to the attention content information.

An invention described in claim 13 is characterized in that the information processing device according to any one of claims 7 to 10, further comprising: a time information acquisition means that acquires time information indicating duration time of the scroll operation, wherein the control means changes a display form of the copy content information according to the duration time indicated by the time information acquired by the time information acquisition means.

According to this configuration, the display form of the copy content changes according to the duration time of the scroll operation, so that it is possible to more effectively distinguish the copy content information and further facilitate the user to continuously pay attention to the attention content information.

An invention described in claim 14 is characterized in that an information processing method performed by a computer that causes content information to be displayed on a display screen of a terminal device, the information processing method comprising: a step of specifying attention content information that is set in advance as content information to which a user is caused to pay attention from among the content information; and a step of causing copy content information which is a copy of the attention content information to be displayed on the display screen according to a user operation that tries to cause the specified attention content information to transit out of a display area.

An invention described in claim 15 is characterized in that an information processing program that causes a computer, which causes content information to be displayed on a display screen of a terminal device, to function as: an attention content information specifying means that specifies attention content information that is set in advance as content information to which a user is caused to pay attention from among the content information; and a control means that causes copy content information which is a copy of the attention content information to be displayed on the display screen according to a user operation that tries to cause the attention content information specified by the attention content information specifying means to transit out of a display area.

An invention described in claim 16 is characterized in that a recording medium in which an information processing program is recorded, the information processing program causing a computer, which causes content information to be displayed on a display screen of a terminal device, to function as: an attention content information specifying means that specifies attention content information that is set in advance as content information to which a user is caused to pay attention from among the content information; and a control means that causes copy content information which is a copy of the attention content information to be displayed on the display screen according to a user operation that tries to cause the attention content information specified by the attention content information specifying means to transit out of a display area.

Effect of the Invention

According to the present invention, it is configured so that in case that attention content information is displayed on a display screen of a terminal device, copy content information which is a copy of the attention content information is displayed on the display screen according to a user operation that tries to cause the attention content information to transit out of a display area, so that even in case that the attention content information is moved out of the display screen according to the user operation, it is possible to facilitate the user to continuously pay attention to (facilitate the user to pay attention to) the attention content information.

BRIEF DESCRIPTION OF DRAWINGS

FIG. 2 is a block diagram showing an example of a schematic configuration of an information providing server SA according to the embodiment.
FIGS. 3(A) and 3(B) are diagrams showing examples of content registered in various databases.
FIGS. 6(A) and 6(B) are diagrams showing display transition examples of web pages according to Example 1.
FIGS. 7(A) and 7(B) are diagrams showing display transition examples of web pages according to Example 1.

FIGS. 11(A) and 1(B) are diagrams showing display transition examples of web pages according to Example 3.

DESCRIPTION OF EMBODIMENT

Hereinafter, an embodiment of the present invention will be described with reference to the drawings. The embodiment described below is an embodiment where the present invention is applied to an information providing system.

[1. Schematic Configuration and Function of Information Providing System]

First, a configuration and a schematic function of an information providing system S according to an embodiment of the present invention will be described with reference to FIG. 1.

Figure 1:
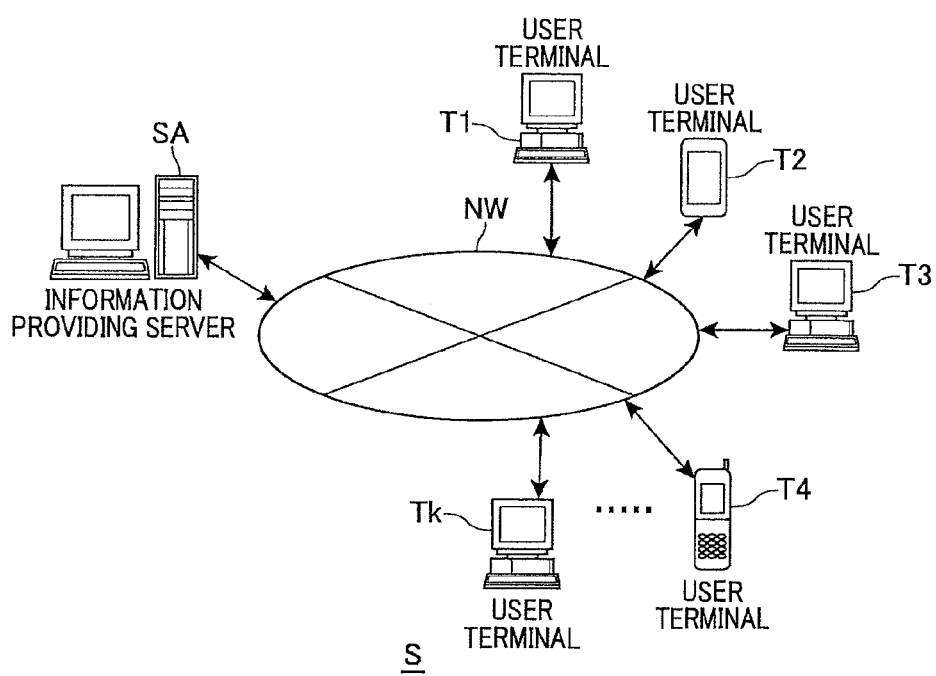
FIG. 1 is a diagram showing an example of a schematic configuration of an information providing system S according to an embodiment.

FIG. 1 is a diagram showing an example of a schematic configuration of the information providing system S according to the present embodiment.

As shown in FIG. 1, the information providing system S includes a plurality of user terminals (an example of a terminal device) Tn (n=1, 2, 3, . . . , k) and an information providing server (an example of an information processing device) SA. Each of the user terminals Tn and the information providing server SA is connected to a network NW. The network NW includes, for example, the Internet, a dedicated communication line (for example, a CATV (Community Antenna Television) line), a mobile communication network (including a base station and the like), a gateway and the like.

The information providing server SA is a server (for example, a web server, a database server and the like) installed to operate, for example, a shopping site or an auction site.

FIG. 2 is a block diagram showing a schematic configuration example of the information providing server SA according to the present embodiment. As shown in FIG. 2, the information providing server SA includes a communication unit 1, a storage unit 2, an input/output interface unit 3, and a system control unit 4. The system control unit 4 and the input/output interface unit 3 are connected through a system bus 5.

The communication unit 1 connects to the network NW and controls communication state with the user terminals Tn.

The storage unit 2 includes, for example, a hard disk drive and stores various programs such as an operating system and a server program. For example, the server program may be distributed from a predetermined server or the like through the network NW or may be recorded in a recording medium such as a CD (Compact Disc), a DVD (Digital Versatile Disc), or the like to be provided.

The storage unit 2 stores a structured document (for example, an HTML (Hyper Text Markup Language) document, an XHTML document and the like) file constituting a web page to be displayed by the user terminal Tn, a CCS (Cascading Style Sheets) file, an image file, and the like. The web page is a page for displaying content information. The content information includes at least either one of a text and an image. For example, the content information is described as an element collected for each content information by div tags (<div> . . . </div>) in a structured document constituting a web page.

Further, in the storage unit 2, a member information database (DB) 21, an exhibited item information database (DB) 22 and the like are constructed. FIGS. 3(A) and 3(B) are diagrams showing examples of content (items) registered in various databases.

In the member information database 21, as shown in FIG. 3(A), a member ID, a nickname, a name or a title, an address, a phone number, an email address, and the like of an individual or a shop which are registered as a member are registered in association with each other for each member. An individual and a shop which are registered as a member can exhibit an item for sale to be sold through a shopping site or an auction site as an exhibitor.

In the exhibited item information database 22, as shown in FIG. 3(B), a member ID of an exhibitor, a nickname or a name of the exhibitor, exhibited item information related to an exhibited item for sale, the presence or absence of attention setting, and the like are registered in association with each other for each exhibited item. The exhibitor can specify the exhibited item information and the presence or absence of attention setting through a setting screen displayed on the user terminal Tn when exhibiting an item for sale. The exhibitor who performs the attention setting pays a fee required for the attention setting to an administrator.

Here, the exhibited item information includes an exhibited item ID, a name of the item for sale (an item for sale name), a description of the item for sale, image data of the item for sale, a price of the item for sale (in the case of auction, a starting price, a buy it now price and the like), an exhibition period, a delivery method of the item for sale, a settlement method (payment method) of the item for sale, and the like. Here, the exhibited item ID is an identifier uniquely given to each exhibited item (in other words, to each exhibited item for sale).

For example, the image of the item for sale, the name of the item for sale, the price of the item for sale, and an exhibitor name (nickname or name) of the item for sale, and the like are collectively described as content information (elements) of the item for sale by div tags in a structured document constituting a web page (the image is described by, for example, an image file name or a URL of the image file). The exhibited item ID associated with the content information of each item for sale is defined to each corresponding div tag as an id attribute, for example.

The presence or absence of attention setting indicates whether or not a setting for causing a user (browser) of the user terminal Tn to pay attention to the content information of the item for sale is performed. The content information that is set in advance as content information to which the user is caused to pay attention is referred to as attention content information. The attention content information can be specified (identified) by a web browser from the structured document constituting the web page. For example, a number system of an exhibited item ID of attention content information of an item for sale where the attention setting is present is set different from a number system of an exhibited item ID of content information of an item for sale where the attention setting is absent. Or, it may be configured so as to define a value that characterizes content information to be attention content information on a div tag that defines attention content information of an item for sale where the attention setting is presence.

The input/output interface unit 3 performs interface processing among the communication unit 1, the storage unit 2, and the system control unit 4.

The system control unit 4 includes a CPU (Central Processing Unit) 4a, a ROM (Read Only Memory) 4b, a RAM (Random Access Memory) 4c, and the like. The system control unit 4, which functions as a computer, performs various processes according to a request from the user terminal Tn by executing a server program. For example, the system control unit 4 transmits a structured document file of a web page for displaying content information to the user terminal Tn through the network NW according to a page request from the user terminal Tn.

Figure 4:
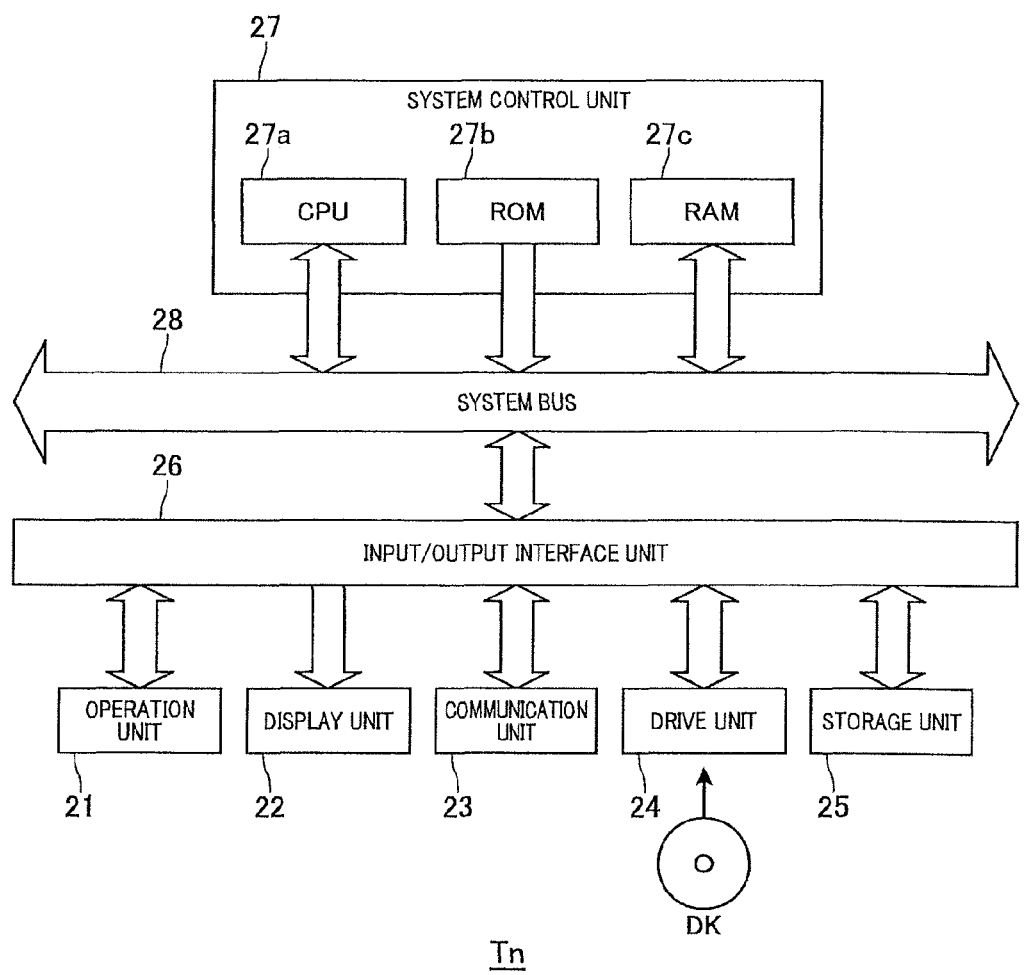
FIG. 4 is a block diagram showing a schematic configuration example of a user terminal Tn according to the embodiment.

Next, FIG. 4 is a block diagram showing a schematic configuration example of the user terminal Tn according to the present embodiment. As shown in FIG. 4, the user terminal Tn includes an operation unit 21, a display unit 22, a communication unit 23, a drive unit 24, a storage unit 25, an input/output interface unit 26, and a system control unit 27. The system control unit 27 and the input/output interface unit 26 are connected through a system bus 28. Examples of the user terminal Tn include a personal computer (PC), a PDA (Personal Digital Assistant), a mobile phone, a smartphone and the like.

Examples of the operation unit 21 include a keyboard, a mouse, a touch panel and the like. In case that the operation unit 21 is operated by a user, an operation signal according to the operation is output to the system control unit 27.

The display unit 22 includes a display for displaying various information. The communication unit 23 connects to the network NW and controls communication state with the information providing server SA and the like. The drive unit 24 reads data and the like from a disk DK (a recording medium) such as, for example, a CD (Compact Disc) and a DVD (Digital Versatile Disk) and records data and the like to the disk DK. The storage unit 25 includes, for example, a hard disk drive and the like and stores an operating system (O/S), a web browser program, and the like.

The system control unit 27 includes a CPU 27a, a ROM 27b, a RAM 27c, and the like. The system control unit 27, which functions as a computer, starts a web browser by executing the web browser program and performs various processes according to an operation on the operation unit 21 by the user (hereinafter referred to as a "user operation"). For example, when the system control unit 27 transmits a page request to the information providing server SA and receives a structured document file and the like of a web page for displaying content information from the information providing server SA, the system control unit 27 displays the web page on a window screen (display screen) appearing on the display. The window screen is an active display area of the web browser.

The system control unit 27 functions as a control means of the present invention. Thereby, in case that attention content information is displayed on the window screen of the user terminal Tn, the control unit 27 performs a copy content information display process that causes copy content information, which is a copy of the attention content information, to be displayed on the window screen according to a user operation that tries to cause the attention content information to transit out of the display area. In this copy content information display process, the system control unit 27 also functions as an attention content information specifying means, a user operation detection means, a display position specifying means, a distance information acquisition means, a time information acquisition means, and the like in the present invention.

The whole or part of the copy content information display process is defined by, for example, a script (for example, JavaScript (registered trademark)) described in a structured document constituting a web page transmitted to the user terminal Tn. The script is an example of a computer-readable information processing program in the present invention and stored in the HTML document described above by the information providing server SA. For example, the information processing program of the present invention may be distributed from a predetermined server or the like through the network NW or may be recorded in a recording medium such as a CD (Compact Disc), a DVD (Digital Versatile Disc), and the like to be provided. In the present embodiment, the script described above is interpreted by the web browser of the system control unit 27, so that the whole or part of the copy content information display process is performed.

Meanwhile, the aforementioned "user operation that tries to cause the attention content information to transit out of the display area" means a user operation that tries to move the attention content information to the outside of the window screen (display area) (in other words, tries to frame out the attention content information). An example of such a user operation is a scroll operation for scrolling display content including content information displayed on the window screen. For example, in case that a part of a display area of a web page is not fully included in the window screen, the display content displayed on the window screen is scrolled (moved) in the horizontal direction (transverse direction), the perpendicular direction (vertical direction), or an oblique direction according to the scroll operation. By this scroll operation, it is possible to change the display position in the window screen (the coordinates in the window screen) of the attention content information. Specific examples of the scroll operation includes operations where the user rotates a wheel (a button between the left and right buttons) of a mouse, the user moves a scroll bar displayed near the window screen by the drag function of the mouse, the user presses the up, down, left, or right key of the keyboard, the user drags the window screen to move the display content to any direction by using a pointing device such as a mouse, and the user flicks on a touch panel (for example, performs a finger flick operation on the touch panel).

The other examples of the aforementioned "user operation that tries to cause the attention content information to transit out of the display area" include a sort operation and a page transition operation (a screen transition operation). Here, the page transition operation is an operation to cause a page of display content including the content information displayed on the window screen to transit to a page including other display content. A specific example of the page transition operation is an operation where the user clicks a button or the like (for example, a portion in which a link "Next 10 items" is set up) displayed on the window screen by a mouse. A slide operation that causes a page of display content including the content information displayed on the window screen to transit to a page including other display content while sliding the page is also an example of the page transition operation. A specific example of the slide operation is an operation where the user flicks on a touch panel. The sort operation is an operation to change the arrangement of a plurality of pieces of content information listed on the window screen (for example, the arrangement is changed from "Order of Arrival from Latest" to "Ascending Order of Price"). A specific example of the sort operation is an operation where the user clicks a button or the like (for example, a portion in which a link "Price Is Low" is set up) displayed on the window screen by a mouse.

[2. Copy Content Information Display Process]

Next, the copy content information display process according to the present embodiment will be described separately in Example 1 to Example 3.

EXAMPLE 1

Figure 5:
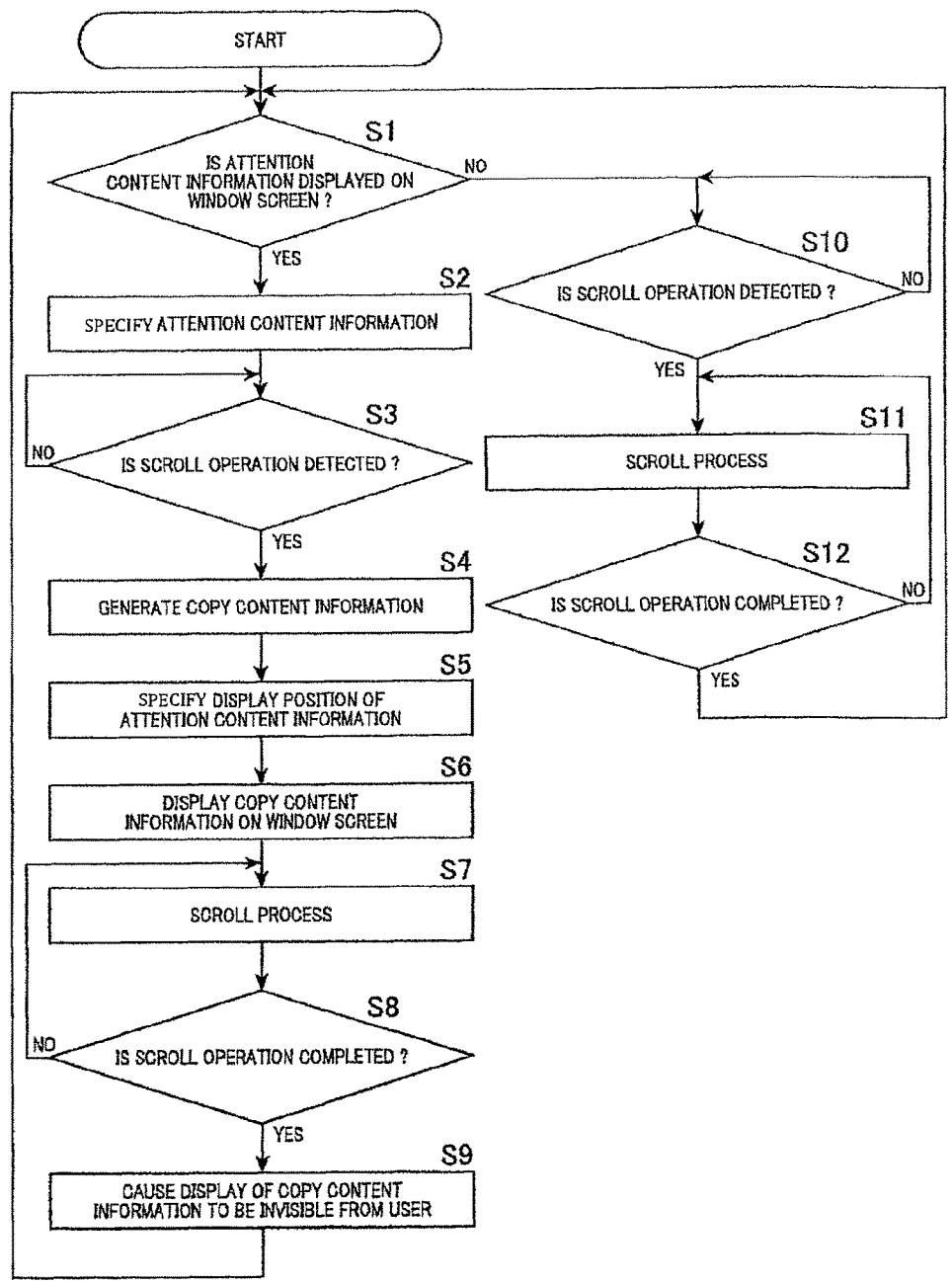
FIG. 5 is a flowchart showing a copy content information display process according to Example 1.

First, the copy content information display process in Example 1 will be described with reference to FIGS. 5 to 7 and the like. In Example 1, a process in which the copy content information is displayed according to the scroll operation will be described. FIG. 5 is a flowchart showing the copy content information display process according to Example 1. FIGS. 6 and 7 are diagrams showing a display transition example of a web page according to Example 1. On the web page shown in FIGS. 6 and 7, a list of a plurality of content information 51 to 57 is displayed. In the process shown in FIG. 5, in particular, a process related to the scroll operation is described and processes related to user operations other than the scroll operation are omitted from the figure for convenience of description.

The process shown in FIG. 5 is started in case that the user terminal T1 receives a structured document file and the like of a web page for displaying content information from the information providing server SA and, for example, as shown in FIG. 6(A), the web page is displayed on the window screen. The copy content information display process is performed according to a script described in the structured document file of the web page.

In step S1 shown in FIG. 5, the system control unit 27 determines whether or not attention content information is displayed on the window screen. For example, this determination is performed by determining whether or not id defined by a div tag that defines the content information displayed on the window screen has a number system of exhibited item ID of attention content information. Or, the determination is performed by determining whether or not a value that characterizes content information to be attention content information is defined on the div tag that defines the content information. If the system control unit 27 determines that attention content information is displayed on the window screen (for example, attention content information is included in a plurality of pieces of content information displayed on the window screen) (step S1, YES), the system control unit 27 specifies the attention content information (for example, specifies the attention content information defined by div tag (data surrounded by <div> and </div>)) (step S2) and proceeds to step S3. In the example shown in FIG. 6(A), the content information 55 corresponds to the attention content information. On the other hand, if the system control unit 27 determines that attention content information is not displayed on the window screen (step S1: NO), the system control unit 27 proceeds to step S10.

In step S3, the system control unit 27 determines whether or not a scroll operation is detected which causes the display content including the attention content information displayed on the window screen to be scrolled. For example, the scroll operation is detected when an operation signal according to the scroll operation is input from the operation unit 21. In case that a user operation other than the scroll operation is detected during a period of time from when the attention content information is specified to when the scroll operation is detected, a process according to the user operation interrupts. If the system control unit 27 detects the scroll operation (step S3: YES), the system control unit 27 generates copy content information which is a copy (duplicate) of the specified attention content information described above (step S4). In other words, at the timing at which the scroll operation is detected, copy content information of the specified attention content information described above is generated. For example, the attention content information defined by div tag (data surrounded by <div> and </div>) is copied as the copy content information from the structured document constituting the web page, so that the copy content information is generated. It may be configured so that the copy content information is generated between the step S2 and the step S3. In other words, it may be configured so that the copy content information is generated before the scroll operation is detected.

Next, the system control unit 27 specifies the display position on the window screen of the attention content information displayed on the window screen (step S5). In other words, the display position of the attention content information when the scroll operation is started is specified. This display position is a position in a layer (hereinafter referred to as "first layer") in which the attention content information is disposed. The display position is represented by, for example, the coordinates on a display area of the attention content information with the upper left corner of the window screen as the origin (for example, the coordinates (x, y) of the upper left corner or the center of the display area or the coordinates (x, y) of the four corners of the display area: x, y are pixels (px)).

It may be configured so that the display position of the attention content information when the scroll operation is started is specified between the step S2 and the step S3. In other words, it may be configured so that the display position is specified before the scroll operation is detected.

Next, the system control unit 27 causes the copy content information generated in the step S5 to be displayed on the window screen according to the scroll operation (step S6). In other words, at the timing at which the scroll operation is detected, copy content information of the specified attention content information described above is displayed. It may be configured so that the display of the copy content information fades in (the copy content information gradually appears). When a plurality of pieces of attention content information is displayed on the window screen, copy content information of each of the pieces of attention content information is generated and the copy content information of each of the pieces of attention content information is displayed on the window screen. Subsequently, the system control unit 27 performs a scroll process that causes the display content including the attention content information to be scrolled according to the scroll operation (step S7). The scrolling of the display content is performed from the start of the scroll operation to the end of the scroll operation.

Here, examples of the display method of the copy content information in the step S6 include (i) a method of fixing and displaying the copy content information at the display position at which the attention content information which is the base of the copy content information was displayed, (ii) a method of moving and displaying the copy content information, and (iii) a method of fixing and displaying the copy content information at a predetermined display position (an arbitrary display position).

Hereinafter, each of the display methods (i) to (iii) will be described.

Case of Display Method (i)

In this case, the copy content information generated in the step S4 is disposed in a second layer (for example, which overlaps the first layer) (for example, a layer (a front layer) whose Z index value is greater than that of the first layer) different from the first layer (for example, Z index value (order of layer on the Z axis)=0)) in which the attention content information is disposed. The system control unit 27 disposes and fixes the copy content information at the same display position in the second layer as that specified in step S5 describe above (the display position of the attention content information in the first layer) and causes the copy content information to be displayed. For example, in a style section of the copy content information (data surrounded by <div> and </div>), the Z index value (1 or more) and the display position specified in step S5 describe above are set. The display position to be set is represented by the coordinates (x, y) with the upper left corner of the window screen as the origin. Then, the copy content information (data surrounded by <div> and </div>) in which the Z index value and the display position are set is described in the structured document constituting the web page, so that the copy content information is displayed on the window screen. For example, data such as "<div id="x0002" style="position: absolute; left:100px; top:100px; z-index:2;>~(copy content information)~</div>" is described in the structured document. Of course, it may be configured so that the style section is described in a CCS file linked from the structured document.

It is more effective that the copy content information is disposed in a degree of transparency (for example, semi-transparent) at which the copy content information can be visually recognized by a user and the background of the copy content information can be visually recognized from the display area of the copy content information. This is because the user can visually recognize content information in the background. Here, the degree of transparency is represented by a value of opacity=0 to 100. The closer to "0" the opacity is, the more transparent (that is, the higher the degree of transparency). On the other hand, the closer to "100" the opacity is, the more opaque (that is, the lower the degree of transparency). For example, "filter: Alpha (opacity=50)" is described in the style section in the structured document that defines the copy content information. However, even when the copy content information is disposed in the degree of transparency (for example, opaque (opacity=100)) at which the background of the copy content information is invisible from the user (that is, cannot be visually recognized by the user) from the display area of the copy content information, a certain level of effect can be obtained. The degree of transparency is also referred to as transmittance.

By the processes described above, as shown in FIG. 6(B), while the display content (background) including the attention content information 55 in the first layer of the window screen is being scrolled, the copy content information 60 is fixed and displayed as a residual image of the attention content information 55 at the display position of the attention content information 55 when the scrolling is started. Thereby, it is possible to effectively distinguish the copy content information as a residual image of the attention content information and facilitate the user to continuously pay attention to the attention content information.

In the case of configuration in which the copy content information is generated and the display position of the attention content information is specified between the step S2 and the step S3, it may be configured so that the system control unit 27 sets the degree of transparency of the generated copy content information to the highest degree (that is, completely transparent (opacity=0)) and disposes the copy content information at the display position in the second layer, and at the timing at which the scroll operation is detected, in step S6, the system control unit 27 sets the degree of transparency of the copy content information to a degree of transparency at which the background of the copy content information can be visually recognized from the display area of the copy content information.

Case of Display Method (ii)

Also in this case, in the same manner as in the case of display method (i), the copy content information generated in the step S4 in Example 1 is disposed in the second layer different from the first layer in which the attention content information is disposed. The system control unit 27 displays the copy content information while moving the copy content information in the second layer of the window screen. For example, it is possible to define scrolling of the copy content information in the second layer by using a MARQUEE tag in the structured document constituting the web page. The scrolling of the copy content information in the second layer is scrolling independent from the scrolling of the display content including the attention content information in the first layer. Thereby, for example, as shown in FIG. 7(A), while the display content including the attention content information 55 in the first layer of the window screen is being scrolled, the copy content information 61 of the attention content information 55 is displayed while being scrolled leftward, rightward, upward, or downward in the window screen from a starting point which is the display position of the attention content information 55 when the scrolling is started. Thereby, it is possible to effectively distinguish the copy content information by scrolling the copy content information and facilitate the user to continuously pay attention to the attention content information.

It may be configured so that the copy content information is displayed while being scrolled leftward, rightward, upward, or downward in the window screen from a starting point which is a predetermined display position. In this case, the process in the step S5 is not required. Here, the direction of the scrolling is defined by, for example, a direction attribute ("left", "right", "up", or "down") in the MARQUEE tag. The way of the scrolling is defined by, for example, a behavior attribute ("scroll" (one way scrolling from one end of the window screen to the other end is repeated), "alternate" (two way scrolling between one end of the window screen and the other end is repeated), and "slide" (scrolling is stopped when reaching one end of the window screen)) in the MARQUEE tag. The speed of the scrolling is defined by, for example, a scrolldelay attribute (defining time until redrawing), a scrollamount attribute (defining distance to redrawing), and the like in the MARQUEE tag.

For example, it may be configured so as to move and display the copy content information irregularly in addition to moving and displaying the copy content information linearly in the manner as in the scrolling described above. Examples of moving and displaying the copy content information irregularly include rotating and displaying the copy content information in the window screen, moving and displaying the copy content information like drawing an arc in the window screen, moving and displaying the copy content information in a zig-zag manner in the window screen and the like. It is possible to define these moving and displaying by, for example, a script described in the structured document constituting the web page.

As another example, it may be configured so that the system control unit 27 displays the copy content information in the second layer while scrolling the copy content information at a speed slower than that of the scrolling of the display content including the attention content information in the first layer in the same direction as that of the scrolling of the display content including the attention content information in the first layer. Thereby, it is possible to scroll the copy content information of the attention content information so that the copy content information chases the scrolling attention content information (scrolling without overtaking the attention content information). As a result, it is possible to effectively distinguish the copy content information and facilitate the user to continuously pay attention to the attention content information. In this case, the system control unit 27 acquires direction information indicating the direction of the scrolling in the first layer performed according to the scroll operation. Here, the direction of the scrolling can be specified from, for example, the display position of the attention content information when the scroll operation is started and the display position of the attention content information whose position is changed by the scrolling. Further, the system control unit 27 acquires speed information indicating the speed of the scrolling in the first layer performed according to the scroll operation. Here, the speed of the scrolling can be calculated by, for example, dividing the amount of movement of the display position of the attention content information whose position is changed by the scrolling by the time required for the movement (the duration time of the scrolling). The "amount of movement" corresponds to, for example, a distance between first coordinates (x1, y1) and second coordinates (x2, y2) in case that a certain pixel on the display area of the attention content information displayed on the window screen (for example, the upper left corner or the center of the display area) moves from the first coordinates with the upper left corner of the window screen as the origin to the second coordinates. It may also be configured so that when the copy content information reaches one end of the window screen by the scrolling, the scrolling of the copy content information is stopped or the copy content information is caused to be invisible from the user (in other words, the user cannot visually recognize the copy content information). It may be considered that a plurality of different pieces of copy content information is displayed on the window screen. In this case, it may be configured so that when certain copy content information reaches one end of the window screen, the copy content information is stopped at this position and continuously displayed, and when next copy content information reaches the one end of the window screen, both pieces of copy content information are displayed side by side (at this time, the sizes of both pieces of copy content information may be reduced).

In the same manner as in the case of display method (i), it is more effective that the copy content information is moved and displayed in a degree of transparency at which the copy content information can be visually recognized by the user and the background of the copy content information can be visually recognized from the display area of the copy content information. In the case of configuration in which the copy content information is generated between the step S2 and the step S3, in the same manner as in the case of display method (i), it may be configured so that the degree of transparency of the copy content information is set to the highest degree and the copy content information is disposed at the display position in the second layer, and at the timing at which the scroll operation is detected, in step S6, the degree of transparency of the copy content information is set to a degree of transparency at which the background of the copy content information can be visually recognized from the display area of the copy content information.

Case of Display Method (iii)

In this case, on the window screen, the system control unit 27 disposes and fixes the copy content information at a predetermined display position 61 and causes the copy content information to be displayed by, for example, a script described in the structured document constituting the web page. Also by this way, it is possible to distinguish the copy content information and facilitate the user to continuously pay attention to the attention content information. In this case, the process in the step S5 is not required. Here, in the case of configuration in which the entire display area on the window screen scrolls, in the same manner as described above, the copy content information is disposed in the second layer different from the first layer in which the attention content information is disposed. On the other hand, as shown in FIG. 7(B), in the case of configuration in which a part of the display area on the window screen scrolls, it may be configured so that the copy content information 62 is displayed in a display area which is other than the display area that scrolls and which is in the first layer in which the attention content information is disposed. Here, a part of the display area that scrolls can be defined as, for example, an inline frame by using an IFRAME tag.

In the case of configuration in which the copy content information is disposed in the second layer different from the first layer in which the attention content information is disposed, in the same manner as in the case of display method (i), it is more effective that the copy content information is moved and displayed in a degree of transparency at which the copy content information can be visually recognized by the user and the background of the copy content information can be visually recognized from the display area of the copy content information. In the case of configuration in which the copy content information is generated between the step S2 and the step S3, in the same manner as in the case of display method (i), it may be configured so that the degree of transparency of the copy content information is set to the highest degree and the copy content information is disposed at the display position in the second layer, and at the timing at which the scroll operation is detected, in step S6, the degree of transparency of the copy content information is set to a degree of transparency at which the background of the copy content information can be visually recognized from the display area of the copy content information.

Next, the system control unit 27 determines whether or not the scroll operation is completed (in other words, determines whether or not the scrolling according to the scroll operation is stopped) (step S8). For example, after an operation signal according to the scroll operation from the operation unit 21 is input into the system control unit 27, when the input of the operation signal is discontinued for a predetermined period of time (for example, 0.5 seconds), it is determined that the scroll operation is completed. If the system control unit 27 determines that the scroll operation is not completed (step S8: NO), the system control unit 27 returns to step S7. In the display method (ii) described above, in the case of configuration in which the copy content information is scrolled in the second layer at a speed slower than that of the scrolling of the display content including the attention content information in the first layer in the same direction as that of the scrolling, it is configured so that the system control unit 27 returns to step S6.

On the other hand, if the system control unit 27 determines that the scroll operation is completed (step S8: YES), the system control unit 27 causes the display of the copy content information displayed in the step S6 to be invisible from the user (step S9). For example, the system control unit 27 causes the copy content information to be invisible from the user by deleting the display of the copy content information (deleting the copy content information (data surrounded by <div> and </div>) from the structured document) or setting the degree of transparency of the copy content information to the highest degree. Or, it may be configured so that the system control unit 27 causes the copy content information to be invisible from the user by setting non-display setting on the copy content information. For example, the non-display setting is performed by using a visibility property (for example, <div style="visibility: hidden" . . . , is set) in the style section of the copy content information (data surrounded by <div> and </div>) (in this case, the display area of the copy content information becomes blank). Or, the non-display setting is performed by using a display property (for example, <div style="display: none" . . . , is set) (in this case, the display area of the copy content does not become blank and the display area is filled with display areas of the previous and the next copy content information).

Thereby, it is possible to prevent the copy content information from being an eyesore for the user due to continuously displaying the copy content information more than necessary. It may be configured so that the display of the copy content information fades out (the copy content information gradually disappears) in the process of step S9 described above.

The timing at which the display of the copy content information is caused to be invisible from the user may be a timing at which a predetermined period of time (for example, 3 seconds) has elapsed from the completion of the scroll operation instead of the timing at which the scroll operation is completed. In this case, the system control unit 27 determines whether or not a predetermined period of time has elapsed from the completion of the scroll operation and causes the display of the copy content information to be invisible from the user in case that the predetermined period of time has elapsed from the completion of the scroll operation.

Or, the timing at which the display of the copy content information is caused to be invisible from the user may be a timing at which the speed of the scrolling according to the scroll operation becomes smaller than (slower than) or equal to a predetermined speed. In this case, the system control unit 27 acquires speed information indicating the speed of the scrolling according to the scroll operation and determines whether or not the speed of the scrolling indicated by the speed information becomes smaller than or equal to a predetermined speed, and in case that the speed of the scrolling becomes smaller than or equal to the predetermined speed, the system control unit 27 causes the display of the copy content information to be invisible from the user.

After the process of step S9, the system control unit 27 returns to step S1 and determines whether or not new attention content information is displayed on the window screen. Specifically, in step S1 in this case, whether or not there is attention content information that is displayed on the window screen for the first time is determined at the timing at which the scroll operation is completed, at the timing at which a predetermined period of time has elapsed from the completion of the scroll operation, or at the timing at which the speed of the scrolling according to the scroll operation becomes smaller than or equal to a predetermined speed. If the system control unit 27 determines that new attention content information is displayed on the window screen (step S1: YES), the system control unit 27 proceeds to step S2, specifies the new attention content information, and performs the processes of step S3 and the following steps in the same manner as described above. Specifically, the system control unit 27 causes the copy content information which is a copy of the new attention content information to be displayed on the window screen according to a new scroll operation by the user.

On the other hand, in step S10, the system control unit 27 determines whether or not the scroll operation is detected which causes the display content displayed on the window screen to be scrolled. In case that a user operation other than the scroll operation is detected during a period of time until when the scroll operation is detected, a process according to the user operation interrupts. If the system control unit 27 detects the scroll operation (step S10: YES), the system control unit performs a scroll process that causes the display content to be scrolled according to the scroll operation (step S11). Next, the system control unit 27 determines whether or not the scroll operation is completed (step S12). If the system control unit 27 determines that the scroll operation is not completed (step S12: NO), the system control unit 27 returns to step S11. On the other hand, if the system control unit 27 determines that the scroll operation is completed (step S12: YES), the system control unit 27 returns to step S1 and performs the same processes as described above. It may be configured so that the system control unit 27 determines whether or not a predetermined period of time has elapsed from the completion of the scroll operation and returns to step S1 in case that the predetermined period of time has elapsed from the completion of the scroll operation. Or, it may be configured so that the system control unit 27 acquires speed information indicating the speed of the scrolling according to the scroll operation and determines whether or not the speed of the scrolling indicated by the speed information becomes smaller than or equal to a predetermined speed, and in case that the speed of the scrolling becomes smaller than or equal to the predetermined speed, the system control unit 27 returns to step S1.

As described above, according to Example 1, it is configured so that the copy content information which is a copy of the attention content information is displayed on the window screen according to the scroll operation in case that the attention content information is displayed on the window screen of the user terminal T1, so that even in case that the attention content information is moved out of the display screen by the scrolling according to the scroll operation, it is possible to prolong the display time of the attention content information, facilitate the user to continuously pay attention to the attention content information, and further, facilitate the user to pay attention to attention content information. In particular, for example, in a list of a lot of content information of as many as hundreds of pieces, once specific content information is framed out by the scrolling, the specific content information is not displayed again until the scroll direction is reversed, so that it is difficult to cause the user to pay attention to the specific content information. However, according to the above configuration, if the attention setting is set on the specific content information, it is possible to easily cause such content information to be paid attention to.

(Modified Form 1 of Example 1)

As a modified form 1 of Example 1 described above, it may be configured so that the copy content information display process is led and performed by the system control unit 4 of the information providing server SA. In this case, the system control unit 4 of the information providing server SA functions as a control means, an attention content information specifying means, a user operation detection means, a display position specifying means, a distance information acquisition means, a time information acquisition means, and the like in the present invention. In this case, the copy content information display process is defined by the server program.

Hereinafter, a case in which the copy content information display process shown in FIG. 5 is performed by the system control unit 4 will be described. In the copy content information display process shown in FIG. 5, the detailed description of the same processes as those performed by the system control unit 27 will be omitted. In this case, for example, the process shown in FIG. 5 is started in case that a structured document file and the like of a web page for displaying content information is transmitted from the information providing server SA to the user terminal T1. In step S1 shown in FIG. 5, the system control unit 4 determines whether or not the attention content information is displayed on the window screen by, for example, acquiring information indicating a display range of the web page (for example, coordinates on the web page) displayed on the window screen from the user terminal T1.

If the system control unit 4 determines that the attention content information is displayed on the window screen (step S1: YES), the system control unit 4 specifies the attention content information (step S2). Next, the system control unit 4 detects the scroll operation (step S3: YES) by acquiring information indicating that there is a scroll operation from the user terminal T1 and generates the copy content information which is a copy of the specified attention content information (step S4). For example, in the same manner as the process performed by the system control unit 27, the attention content information defined by the div tag is copied as the copy content information from the structured document constituting the web page, so that the copy content information is generated. Each setting in the style section and the like is performed in order to cause the copy content information to be displayed by the display methods (i) to (iii) described above. The copy content information may be generated and stored in advance (before the process shown in FIG. 5).

Next, the system control unit 4 specifies the display position on the window screen of the attention content information displayed on the window screen on the basis of the information indicating the display range of the web page acquired from the user terminal T1 (step S5). Next, the system control unit 4 transmits the copy content information (data surrounded by <div> and </div>) generated in the step S4, information necessary to cause the copy content information to be displayed (including information indicating the display position identified in the step S5) and the like to the user terminal T1, so that the system control unit 4 causes the copy content information to be displayed on the window screen (causes the web browser to display the copy content information) (step S6). This process is performed by using, for example, Ajax without refreshing the entire web page (the user terminal T1 does not reload the web page from the information providing server SA). In this way, the copy content information is displayed by either one of the display methods (i) to (iii) while the display content including the attention content information is being scrolled on the user terminal T1. It may be configured so that the speed of the scrolling is calculated by the system control unit 4 on the basis of the information indicating the display range of the web page and the like or the speed information indicating the speed of the scrolling is acquired from the user terminal T1 by the system control unit 4. In the scroll process in step S7

(which is the same as in step S10), the system control unit 4 acquires the information indicating the display range of the web page displayed on the window screen from the user terminal T1 while the display content including the attention content information is being scrolled.

Next, if the system control unit 4 determines that the scroll operation is completed by acquiring information indicating that the scroll operation is completed from the user terminal T1 (step S8: YES), the system control unit 4 causes the display of the copy content information to be invisible from the user (step S9). For example, the system control unit 4 causes the copy content information to be invisible from the user by deleting the display of the copy content information or transmitting a command to set the degree of transparency of the copy content information to the highest degree to the user terminal T1. In this case, it may be configured so that the system control unit 4 causes the copy content information to be invisible from the user at the timing at which a predetermined period of time has elapsed from the completion of the scroll operation or at the timing at which the speed of the scrolling becomes smaller than or equal to a predetermined speed as described above by transmitting information indicating the timing at which the display of the copy content information is caused to be invisible from the user to the user terminal T1. After the process of step S9, the system control unit 4 returns to step S1 and determines whether or not new attention content information is displayed on the window screen on the basis of the information indicating the display range of the web page. The processes thereafter are basically the same as those described above, so that the description thereof is omitted.

(Modified Form 2 of Example 1)

As a modified form 2 of Example 1, it may be configured so that a display form of the copy content information of the attention content information disposed in the first layer is changed according to the speed of the scrolling of the display content including the attention content information disposed in the first layer. Here, examples of the display form of the copy content information include the degree of transparency, the display size and the like.

In the case of configuration in which the system control unit 27 of the user terminal T1 changes the degree of transparency of the copy content information according to the speed of the scrolling, for example, information (for example, a table or a calculation formula) indicating a correspondence relationship between the speed and the degree of transparency is defined in a script described in the structured document constituting the web page. On the other hand, in the case of configuration in which the system control unit 4 of the information providing server SA changes the degree of transparency of the copy content information according to the speed of the scrolling, for example, information indicating a correspondence relationship between the speed and the degree of transparency is stored in the storage unit 2.

The system control unit 27 or the system control unit 4 acquires the speed information indicating the speed of the scrolling and refers to the information indicating the correspondence relationship, so that the system control unit 27 or the system control unit 4 sets the degree of transparency of the copy content information so that the slower the speed indicated by the acquired speed information is, the lower the degree of transparency of the copy content information is. The slower the speed of the scrolling in the first layer is, the more the display content (background) in the first layer and the copy content information in the second layer assimilate to each other, and the more difficult for the user to see the copy content information. Therefore, if it is configured so that the slower the speed of the scrolling in the first layer is, the lower the degree of transparency of the copy content information is set, it is possible to display the copy content information in the second layer in a deep color and distinguish the copy content information (if the speed of the scrolling of the background is high, the degree of transparency of the copy content information may be high (thin)). It may also be configured so that the system control unit 27 or the system control unit 4 acquires the speed information indicating the speed of the scrolling a plurality of times at predetermined intervals and every time the speed information is acquired, the system control unit 27 or the system control unit 4 changes the degree of transparency of the copy content information according to the speed of the scrolling.

On the other hand, as an example different from the above example, it may be configured so that the faster the speed indicated by the acquired speed information is, the lower the degree of transparency of the copy content information is set. This is because the faster the speed of the scrolling, the earlier the attention content information is framed out, so that the copy content information of the attention content information is displayed in a deep color to be distinguished.

It may also be configured so that the display color of the copy content information is changed according to the speed of the scrolling in the first layer by using display color instead of the degree of transparency as the display form of the copy content information.

In the case of configuration in which the system control unit 27 of the user terminal T1 changes the display size of the copy content information (that is, the size of the display area of the copy content information) according to the speed of the scrolling, for example, information (for example, a table or a calculation formula) indicating a correspondence relationship between the speed and the display size (defined by, for example, pixels of the width and the height) is defined in a script described in the structured document constituting the web page. On the other hand, in the case of configuration in which the system control unit 4 of the information providing server SA changes the display size of the copy content information according to the speed of the scrolling, for example, information indicating a correspondence relationship between the speed and the display size is stored in the storage unit 2.

The system control unit 27 or the system control unit 4 acquires the speed information indicating the speed of the scrolling and refers to the information indicating the correspondence relationship, so that the system control unit 27 or the system control unit 4 sets the display size of the copy content information so that the slower the speed indicated by the acquired speed information is, the larger the display size of the copy content information is. If it is configured so that the slower the speed of the scrolling in the first layer is, the larger the display size of the copy content information is set, it is possible to largely display the copy content information in the second layer and distinguish the copy content information. It may also be configured so that the system control unit 27 acquires the speed information indicating the speed of the scrolling a plurality of times at predetermined intervals and every time the speed information is acquired, the system control unit 27 changes the display size of the copy content information according to the speed of the scrolling.

(Modified Form 3 of Example 1)

As a modified form 3 of Example 1, it may be configured so that the display form of the copy content information of the attention content information disposed in the first layer is changed according to a distance by which the display content including the attention content information disposed in the first layer is scrolled. Also in the case of this configuration, examples of the display form of the copy content information include the degree of transparency, the display size and the like.

In the case of configuration in which the system control unit 27 of the user terminal T1 changes the degree of transparency of the copy content information according to the scrolled distance, for example, information (for example, a table or a calculation formula) indicating a correspondence relationship between the distance (for example, the number of pixels) and the degree of transparency is defined in a script described in the structured document constituting the web page. On the other hand, in the case of configuration in which the system control unit 4 of the information providing server SA changes the degree of transparency of the copy content information according to the scrolled distance, for example, information indicating a correspondence relationship between the distance and the degree of transparency is stored in the storage unit 2.

The system control unit 27 or the system control unit 4 acquires distance information indicating the distance from the display position of the attention content information when the scroll operation is started to the display position of the attention content information whose position is changed by the scrolling. In the case of configuration in which the system control unit 4 changes the degree of transparency of the copy content information according to the scrolled distance, it may be configured so that the distance to the display position of the attention content information whose position is changed by the scrolling is calculated by the system control unit 4 on the basis of the information indicating the display range of the web page and the like or it may be configured so that distance information indicating the distance is acquired from the user terminal T1 by the system control unit 4. Here, the display position of the attention content information is represented by, for example, the coordinates on the display area of the attention content information with the upper left corner of the window screen as the origin (for example, the coordinates (x1, y1) of the upper left corner or the center of the display area). The system control unit 27 or the system control unit 4 refers to the information indicating the correspondence relationship, so that the system control unit 27 or the system control unit 4 sets the degree of transparency of the copy content information so that the longer the distance indicated by the acquired distance information is, the higher the degree of transparency of the copy content information is. Thereby, for example, it is possible not to distinguish the copy content information by configuring so that the further (farther) the attention content information is away from the original display position, the lighter the color of the copy content information in the second layer is displayed. Thereby, it is possible to prevent the copy content information from being an eyesore for the user. It may also be configured so that the longer the scrolled distance is, the lighter the display color of the copy content information is set by using the display color instead of the degree of transparency as the display form of the copy content information.

In the case of configuration in which the system control unit 27 of the user terminal T1 changes the display size of the copy content information according to the scrolled distance, for example, information (for example, a table or a calculation formula) indicating a correspondence relationship between the distance and the display size is defined in a script described in the structured document constituting the web page. On the other hand, in the case of configuration in which the system control unit 4 of the information providing server SA changes the display size of the copy content information according to the scrolled distance, for example, information indicating a correspondence relationship between the distance and the display size is stored in the storage unit 2.

The system control unit 27 or the system control unit 4 acquires the distance information indicating the distance from the display position of the attention content information when the scroll operation is started to the display position of the attention content information whose position is changed by the scrolling and refers to the information indicating the correspondence relationship, so that the system control unit 27 or the system control unit 4 sets the display size of the copy content information so that the longer the distance indicated by the acquired distance information is, the smaller the display size of the copy content information is. Thereby, for example, it is possible not to distinguish the copy content information by configuring so that the further (farther) the attention content information is away from the original display position, the smaller the display size of the copy content information in the second layer is. Thereby, it is possible to prevent the copy content information from being an eyesore for the user.

(Modified Form 4 of Example 1)

As a modified form 4 of Example 1, it may be configured so that the display form of the copy content information of the attention content information is changed according to the duration time of the scroll operation. Also in the case of this configuration, examples of the display form of the copy content information include the degree of transparency, the display size and the like. For example, the duration time of the scroll operation is a period of time in which an operation signal according to the scroll operation is continuously input.

In the case of configuration in which the system control unit 27 of the user terminal T1 changes the degree of transparency of the copy content information according to the duration time of the scroll operation, for example, information (for example, a table or a calculation formula) indicating a correspondence relationship between the time and the degree of transparency is defined in a script described in the structured document constituting the web page. On the other hand, in the case of configuration in which the system control unit 4 of the information providing server SA changes the degree of transparency of the copy content information according to the duration time of the scroll operation, for example, information indicating a correspondence relationship between the time and the degree of transparency is stored in the storage unit 2.

The system control unit 27 or the system control unit 4 acquires time information indicating the duration time of the scroll operation. In the case of configuration in which the system control unit 4 changes the degree of transparency of the copy content information according to the duration time of the scroll operation, it may be configured so that the duration time of the scroll operation is calculated by the system control unit 4 on the basis of information from the user terminal T1 and the like or it may be configured so that time information indicating the duration time is acquired from the user terminal T1 by the system control unit 4. The system control unit 27 or the system control unit 4 refers to the information indicating the correspondence relationship, so that the system control unit 27 or the system control unit 4 sets the degree of transparency of the copy content information so that the longer the duration time indicated by the acquired time information is, the higher the degree of transparency of the copy content information is. Thereby, it is possible not to distinguish the copy content information by configuring so that the longer the duration time of the scroll operation is, the lighter the color of the copy content information in the second layer is displayed. Thereby, it is possible to prevent the copy content information from being an eyesore for the user. It may also be configured so that the longer the duration time of the scroll operation is, the lighter the display color of the copy content information is set by using the display color instead of the degree of transparency as the display form of the copy content information.

In the case of configuration in which the system control unit 27 of the user terminal T1 changes the display size of the copy content information according to the duration time of the scroll operation, for example, information (for example, a table or a calculation formula) indicating a correspondence relationship between the time and the display size is defined in a script described in the structured document constituting the web page. On the other hand, in the case of configuration in which the system control unit 4 of the information providing server SA changes the display size of the copy content information according to the duration time of the scroll operation, for example, information indicating a correspondence relationship between the time and the display size is stored in the storage unit 2.

The system control unit 27 or the system control unit acquires the time information indicating the duration time of the scroll operation and refers to the information indicating the correspondence relationship, so that the system control unit 27 or the system control unit 4 sets the display size of the copy content information so that the longer the duration time indicated by the acquired time information is, the smaller the display size of the copy content information is. Thereby, it is possible not to distinguish the copy content information by configuring so that the longer the duration time of the scroll operation is, the smaller the display size of the copy content information in the second layer is. Thereby, it is possible to prevent the copy content information from being an eyesore for the user.

EXAMPLE 2

Figure 8:
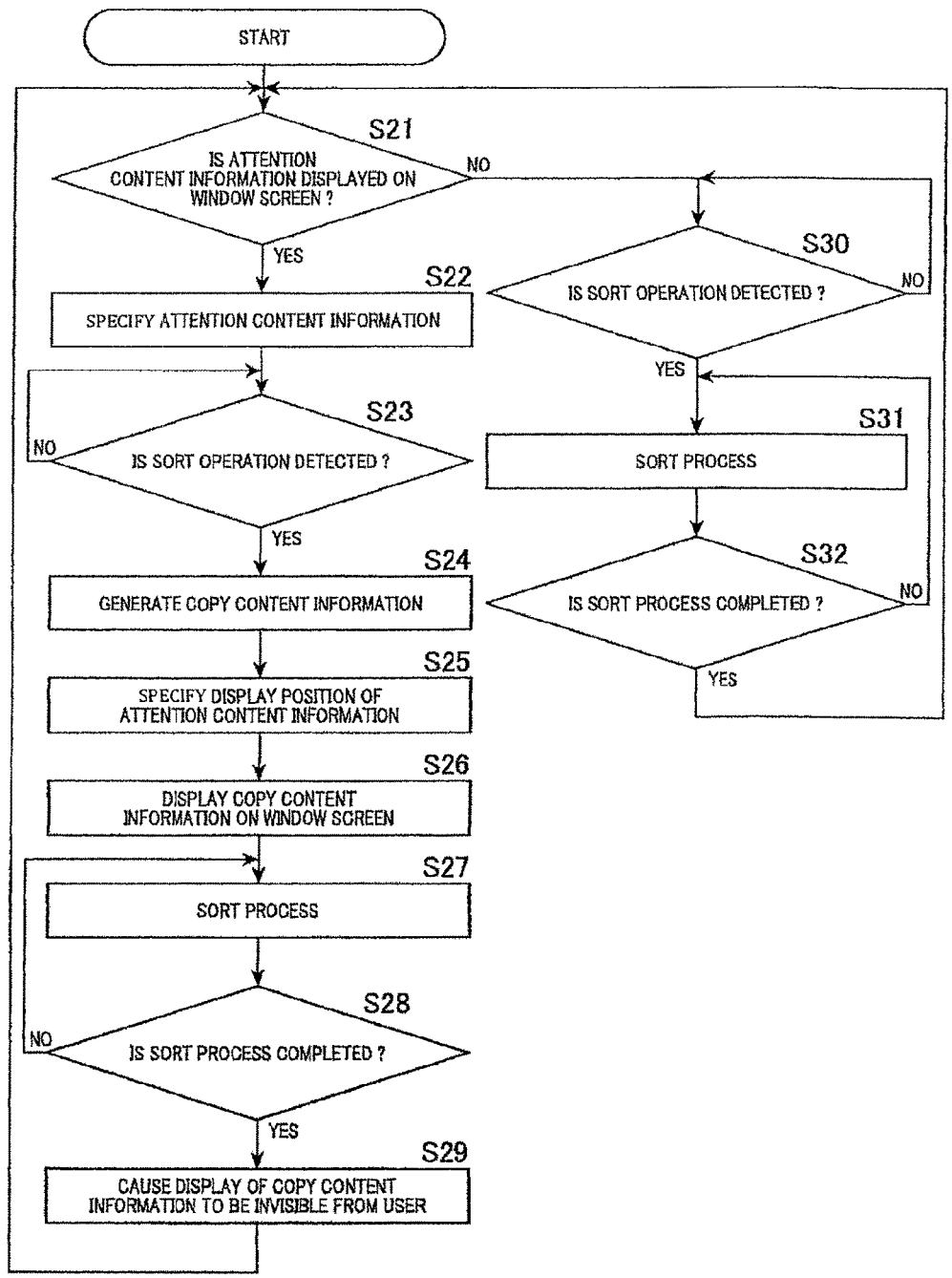
FIG. 8 is a flowchart showing a copy content information display process according to Example 2.
Figure 9:
FIGS. 9(A) and 9(B) are diagrams showing display transition examples of web pages according to Example 2.

Next, the copy content information display process in Example 2 will be described with reference to FIGS. 8 and 9 and the like. In Example 2, a process in which the copy content information is displayed according to the sort operation will be described. FIG. 8 is a flowchart showing the copy content information display process according to Example 2. FIGS. 9(A) and 9(B) are diagrams showing display transition examples of web pages according to Example 2. In the process shown in FIG. 8, in particular, a process related to the sort operation is described and processes related to user operations other than the sort operation are omitted from the figure for convenience of description. In the copy content information display process shown in FIG. 8, the detailed description of the same processes as those of the copy content information display process shown in FIG. 5 will be omitted.

The process shown in FIG. 8 is started when the web page is displayed on the window screen in the same manner as the process shown in FIG. 5. The processes in steps S21 and S22 shown in FIG. 8 are the same as those in steps S1 and S2 shown in FIG. 5.

In step S23, the system control unit 27 determines whether or not a sort operation is detected which causes the arrangement of content information in a list of a plurality of pieces of content information displayed on the window screen to be sorted. For example, the sort operation is detected when an operation signal according to the sort operation is input from the operation unit 21. Here, in the example shown in FIG. 6(A), the sort operation is performed when the user clicks the section 71 "Ascending Order of Price" (this may be "Price Is Low" or "Many Comments") by a mouse or touches the section 71 by a finger. In case that a user operation other than the sort operation is detected during a period of time from when the attention content information is specified to when the sort operation is detected, a process according to the user operation interrupts.

If the system control unit 27 detects the sort operation (step S23: YES), the system control unit 27 generates copy content information which is a copy of the specified attention content information described above (step S24). In other words, at the timing at which the sort operation is detected, copy content information of the specified attention content information described above is generated. It may be configured so that the copy content information is generated between the step S22 and the step S23.

The process in step S25 shown in FIG. 8 is the same as that in step S5 shown in FIG. 5. It may be configured so that the display position of the attention content information when the sort operation is started is identified between the step S22 and the step S23.

Next, the system control unit 27 causes the copy content information generated in the step S25 to be displayed on the window screen according to the sort operation (step S26). Then, the system control unit 27 performs a sort process that causes the arrangement of a plurality of pieces of content information displayed on the window screen to be changed (rearranged) according to the sort operation (step S27). This sort process is performed by using Ajax and Flash without refreshing the entire web page (the user terminal T1 does not reload the web page from the information providing server SA) (in other words, a list section of the content information on the web page is refreshed). If it is configured so that the copy content information generated in the step S24 and the information indicating the display position identified in the step S25 are stored in the RAM 27c of the user terminal T1, it may be configured so that the entire web page is refreshed.

Here, as a display method of the copy content information in the step S26, each of the display methods (i) to (iii) can be applied in the same manner as in Example 1. For example, according to the display method (i), as shown in FIG. 9(A), during the sort process (in other words, while the list section of the content information is being refreshed), the copy content information 63 is fixed and displayed as a residual image of the attention content information 55 shown in FIG. 6(A) at the display position of the attention content information 55 when the sort is started.

Next, the system control unit 27 determines whether or not the sort process is completed (step S28). If the system control unit 27 determines that the sort process is not completed (step S28: NO), the system control unit 27 returns to step S27. On the other hand, if the system control unit 27 determines that the sort process is completed (step S28: YES), the system control unit 27 causes the display of the copy content information displayed in the step S26 to be invisible from the user (step S29). In this way, as shown in FIG. 9(B), while the list of a plurality of pieces of content information rearranged by the sort is displayed, the copy content information 63 becomes invisible from the user.

Next, after the sort process is completed, the system control unit 27 returns to step S21 and determines whether or not new attention content information is displayed on the window screen. If the system control unit 27 determines that new attention content information is displayed on the window screen (step S21: YES), the system control unit 27 proceeds to the step S22, specifies the new attention content information, and performs the processes of step S23 and the following steps in the same manner as described above. Specifically, the system control unit 27 causes the copy content information which is a copy of the new attention content information to be displayed on the window screen according to a new sort operation by the user.

It may be configured so that the system control unit 27 determines whether or not a predetermined period of time (for example, 5 seconds) has elapsed from the completion of the sort process and causes the display of the copy content information to be invisible from the user in case that the predetermined period of time has elapsed from the completion of the sort process. It may also be configured so that the system control unit 27 returns to step S21 in case that a predetermined period of time has elapsed from the completion of the sort process and determines whether or not new attention content information is displayed on the window screen.

On the other hand, in step S30, the system control unit 27 determines whether or not a sort operation is detected and if the sort operation is detected (step S30: YES), the system control unit 27 performs the sort process according to the sort operation (step S31). Next, the system control unit 27 determines whether or not the sort process is completed (step S32). If the system control unit 27 determines that the sort process is not completed (step S32: NO), the system control unit 27 returns to step S31. On the other hand, if the system control unit 27 determines that the sort process is completed (step S32: YES), the system control unit 27 returns to step S21 and performs the same processes as described above. It may be configured so that the system control unit 27 determines whether or not a predetermined period of time has elapsed from the completion of the sort process and returns to step S21 in case that the predetermined period of time has elapsed from the completion of the sort process.

As described above, according to Example 2, it is configured so that the copy content information which is a copy of the attention content information is displayed on the window screen according to the sort operation in case that the attention content information is displayed on the window screen of the user terminal T1, so that even in case that the attention content information is moved out of the window screen by the rearrangement of the content information according to the sort operation, it is possible to prolong the display time of the attention content information, facilitate the user to continuously pay attention to the attention content information, and further, facilitate the user to pay attention to attention content information. In particular, for example, in a list of a lot of content information of as many as hundreds of pieces, once specific content information is framed out by the sort, the specific content information is not displayed again until the content information is restored to the original arrangement, so that it is difficult to cause the user to pay attention to the specific content information. However, according to the above configuration, if the attention setting is set on the specific content information, it is possible to easily cause such content information to be paid attention to.

Also in Example 2, in the same manner as in the modified form 1 of Example 1 described above, it may be configured so that the copy content information display process is led and performed by the system control unit 4 of the information providing server SA.

EXAMPLE 3

Figure 10:
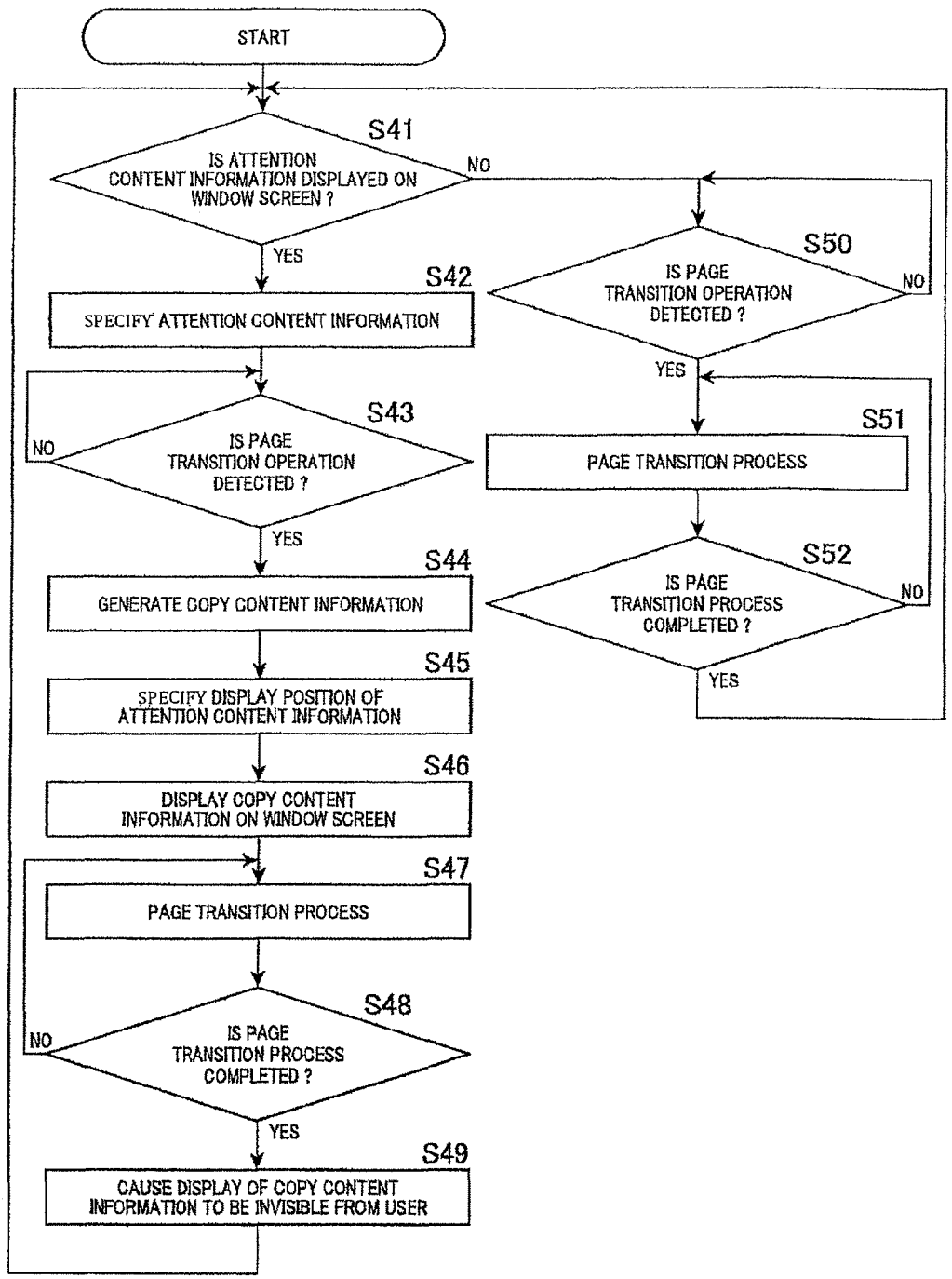
FIG. 10 is a flowchart showing a copy content information display process according to Example 3.
Figure 11:
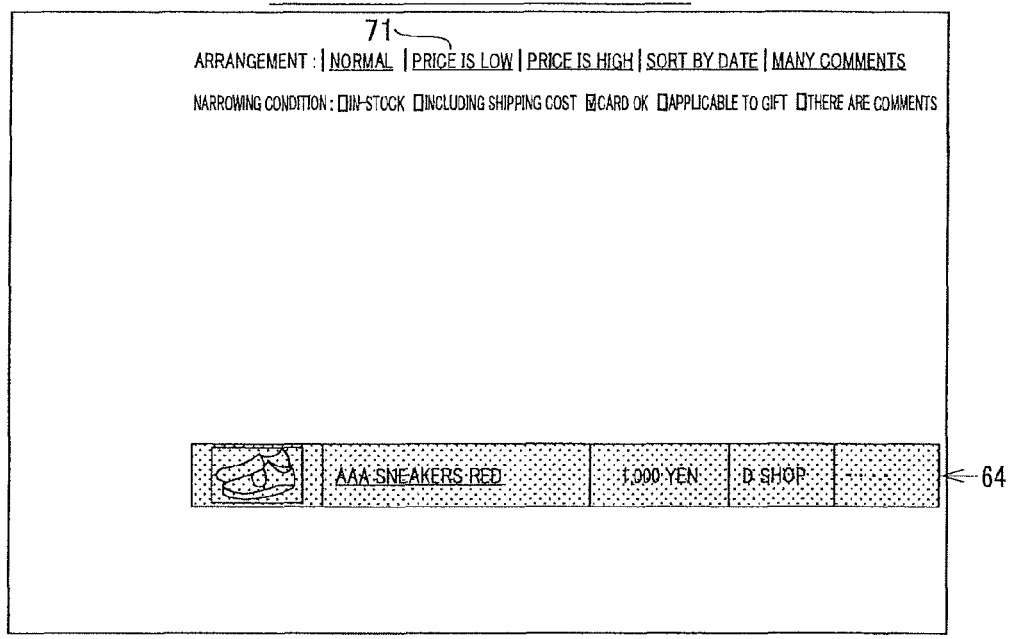

Next, the copy content information display process in Example 3 will be described with reference to FIGS. 10 and 11 and the like. In Example 3, a process in which the copy content information is displayed according to the page transition operation will be described. FIG. 10 is a flowchart showing the copy content information display process according to Example 3. FIGS. 11(A) and 11(B) are diagrams showing display transition examples of web pages according to Example 3. In the process shown in FIG. 10, in particular, a process related to the page transition operation is described and processes related to user operations other than the page transition operation are omitted from the figure for convenience of description.

The process shown in FIG. 10 is started in case that the web page is displayed on the window screen in the same manner as the process shown in FIG. 5. The processes in steps S41 and S42 shown in FIG. 10 are the same as those in steps S1 and S2 shown in FIG. 5.

In step S43, the system control unit 27 determines whether or not a page transition operation is detected which causes a page of the display content including content information displayed on the window screen to transit to a page including other display content. For example, the page transition operation is detected when an operation signal according to the page transition operation is input from the operation unit 21. Here, in the example shown in FIG. 6(A), the page transition operation is performed when the user clicks the section 81 "Next 100 items" (this may be the section "2" that represents a page number) by a mouse or touches the section 81 by a finger. When a user operation other than the page transition operation is detected during a period of time from when the attention content information is detected to when the page transition operation is detected, a process according to the user operation interrupts.

If the system control unit 27 detects the page transition operation (step S43: YES), the system control unit 27 generates copy content information which is a copy of the specified attention content information described above (step S44). In other words, at the timing at which the page transition operation is detected, copy content information of the specified attention content information described above is generated. It may be configured so that the copy content information is generated between the step S42 and the step S43.

The process in step S45 shown in FIG. 10 is the same as that in step S5 shown in FIG. 5. It may be configured so that the display position of the attention content information when the page transition operation is started is specified between the step S42 and the step S43.

Next, the system control unit 27 causes the copy content information generated in the step S25 to be displayed on the window screen according to the page transition operation (step S46). Then, the system control unit 27 performs a page transition process that causes the page of the display content including the attention content information displayed on the window screen to transit to the next page (display transition) according to the page transition operation (step S47). Here, the page transition process is performed by using Ajax and Flash without refreshing the entire web page (the user terminal T1 does not reload the web page from the information providing server SA) (in other words, a list section of the content information on the web page is refreshed). If it is configured so that the copy content information generated in the step S44 and the information indicating the display position specified in the step S45 are stored in the RAM 27c of the user terminal T1, it may be configured so that the entire web page is refreshed.

Here, as a display method of the copy content information in the step S46, each of the display methods (i) to (iii) can be applied in the same manner as in Example 1. For example, according to the display method (i), as shown in FIG. 11(A), during the page transition process, the copy content information 64 is fixed and displayed as a residual image of the attention content information 55 shown in FIG. 6(A) at the display position of the attention content information 55 when the page transition is started.

Next, the system control unit 27 determines whether or not the page transition process is completed (step S48). If the system control unit 27 determines that the page transition process is not completed (step S48: NO), the system control unit 27 returns to step S47. On the other hand, if the system control unit 27 determines that the page transition operation is completed (step S48: YES), the system control unit 27 causes the display of the copy content information displayed in the step S46 to be invisible from the user (step S49). In this way, as shown in FIG. 11(B), while the list of a plurality of pieces of content information is displayed on the next page to which the page transits by the page transition process, the copy content information 64 becomes invisible from the user. After the page transition process is completed, the system control unit 27 returns to step S41 and determines whether or not new attention content information is displayed on the window screen. If the system control unit 27 determines that new attention content information is displayed on the window screen (step S41: YES), the system control unit 27 proceeds to the step S42, specifies the new attention content information, and performs the processes of step S43 and the following steps in the same manner as described above. Specifically, the system control unit 27 performs the page transition process according to a new page transition operation by the user and subsequently causes the copy content information which is a copy of the new attention content information to be displayed on the window screen.

It may be configured so that the system control unit 27 determines whether or not a predetermined period of time (for example, 5 seconds) has elapsed from the completion of the page transition process and causes the display of the copy content information to be invisible from the user in case that the predetermined period of time has elapsed from the completion of the page transition process. It may also be configured so that the system control unit 27 returns to step S41 in case that a predetermined period of time has elapsed from the completion of the page transition process and determines whether or not new attention content information is displayed on the window screen.

On the other hand, in step S50, the system control unit 27 determines whether or not a page transition operation is detected and if the page transition operation is detected (step S50: YES), the system control unit 27 performs the page transition process according to the page transition operation (step S51). Next, the system control unit 27 determines whether or not the page transition process is completed (step S52). If the system control unit 27 determines that the page transition process is not completed (step S52: NO), the system control unit 27 returns to step S51. On the other hand, if the system control unit 27 determines that the page transition process is completed (step S52: YES), the system control unit 27 returns to step S41 and performs the same processes as described above. It may be configured so that the system control unit 27 determines whether or not a predetermined period of time has elapsed from the completion of the page transition process and returns to step S41 in case that the predetermined period of time has elapsed from the completion of the page transition process.

As described above, according to Example 3, it is configured so that the copy content information which is a copy of the attention content information is displayed on the window screen according to the page transition operation in case that the attention content information is displayed on the window screen of the user terminal T1, so that even in case that the attention content information is moved out of the window screen by the page transition according to the page transition operation, it is possible to prolong the display time of the attention content information, facilitate the user to continuously pay attention to the attention content information, and further, facilitate the user to pay attention to attention content information. In particular, for example, in a list of a lot of content information of as many as hundreds of pieces, once specific content information is framed out by the page transition, the specific content information is not displayed again until the original page is restored, so that it is difficult to cause the user to pay attention to the specific content information. However, according to the above configuration, if the attention setting is set on the specific content information, it is possible to easily cause such content information to be paid attention to.

Also in Example 3, in the same manner as in the modified form 1 of Example 1 described above, it may be configured so that the copy content information display process is led and performed by the system control unit 4 of the information providing server SA.

Although in the embodiment described above, the case in which the attention content information is included in a list of content information is described as an application example of the present invention, it is possible to apply the present invention to a case in which the attention content information is displayed on the window screen as, for example, advertisement information independently from the list of content information.

REFERENCE SIGNS LIST

1 Communication unit
2 Storage unit
3 Input/output interface unit
4 System control unit
5 System bus
21 Operation unit
22 Display unit
23 Communication unit
24 Drive unit
25 Storage unit
26 Input/output interface unit
27 System control unit
28 System bus
Tn User terminal
SA Information providing server
NW Network

The invention claimed is:

1. An information processing device that causes content information to be displayed on a display of a terminal device, the information processing device comprising: at least one non-transitory memory operable to store program code;

at least one processor operable to read said program code and configured to operate as instructed by said program code, said program code including:
receiving code configured to cause the at least one processor to receive a search keyword from the terminal device;
generating code configured to generate a digital content data file based on a search result using the search keyword, the digital content data file including a list of a plurality of items corresponding to the search keyword in a sorted state according to a sorting condition;
transmitting code configured to cause the at least one processor to transmit to the terminal device a search result screen configured to display the digital content data file as content information in a first layer of a scrollable region of a display screen of a display of the terminal device;
attention content information specifying code configured to cause the at least one processor to specify one item among the plurality of items in the list as attention content information that is set in advance before the search result screen is transmitted by the transmitting code, as content information to which a user is caused to pay attention;
detecting code configured to cause the at least one processor to determine whether a scroll operation is detected which causes the attention content information on the display of the terminal device to be scrolled in the scrollable region of the display screen; and
control code configured to cause the at least one processor to copy the specified attention content information as copy content information,
wherein, in response to determining the scroll operation is detected, the transmitting code is further configured to cause at the at least one processor to transmit a modified search result screen configured to display the copy content information in a second layer superimposed over at least one of the plurality of items in the first layer within the scrollable region while displaying the attention content information in the first layer,
wherein the copy content information is displayed in the search result screen in a sorted manner, along with information indicating the ranking of the plurality of items in the sorted state, and
wherein the attention content information in the first layer moves from a first location to a second location according to the detected scroll operation, while the copy content information in the second layer of the scrollable region is moved from the same first location to the same second location, at a speed slower than a speed of the attention content in the first layer in the same direction, and
wherein the copy information remains on the search result screen even after the attention content is scrolled out of the search result screen.

2. The information processing device according to claim 1, further comprising:
user operation detection code configured to cause the at least one processor to detect the scroll operation in response to a user operation.

3. The information processing device according to claim 1, wherein
the copy content information is disposed in the second layer different from the first layer in which the attention content information is displayed on the display screen,
the information processing device further comprises display position specifying code configured to cause the at least one processor to specify a display position of the attention content information in the first layer of the scrollable region when the scroll operation is started, and
the transmitting code is further configured to cause the at least one processor to transmit the modified search result screen configured to fix the copy content information in the second layer of the scrollable region at a display position which is the same as the display position specified by the display position specifying code.

4. The information processing device according to claim 3, wherein the transmitting code is further configured to cause the at least one processor to transmit the modified search result screen configured to display the copy content information to be invisible in case that the scroll operation is completed or a predetermined period of time has elapsed from the completion of the scroll operation.

5. The information processing device according to claim 1, wherein
the copy content information is disposed in the second layer different from the first layer in which the attention content information is displayed on the display screen, and
the transmitting code is further configured to cause the at least one processor to transmit the modified search result screen configured to display the copy content information while causing the copy content information to move in the second layer of the scrollable region.

6. The information processing device according to claim 5, wherein the transmitting code is further configured to cause the at least one processor to transmit the modified search result screen configured to display the copy content information to be invisible in case that the scroll operation is completed or a predetermined period of time has elapsed from the completion of the scroll operation.

7. The information processing device according to claim 1, wherein the transmitting code is further configured to cause the at least one processor to transmit the modified search result screen configured to fix the copy content information at a predetermined display position in the second layer of the scrollable region.

8. The information processing device according to claim 7, wherein the transmitting code is further configured to cause the at least one processor to transmit the modified search result screen configured to display the copy content information to be invisible in case that the scroll operation is completed or a predetermined period of time has elapsed from the completion of the scroll operation.

9. The information processing device according to claim 1, wherein the transmitting code is further configured to cause the at least one processor to transmit the modified search result screen configured to display the copy content information to be invisible in case that the scroll operation is completed or a predetermined period of time has elapsed from the completion of the scroll operation.

10. The information processing device according to claim 1, wherein the transmitting code is further configured to cause the at least one processor to transmit the modified search result screen configured to display the copy content information to be invisible in case that a speed of the scrolling operation becomes smaller than or equal to a predetermined speed.

11. The information processing device according to claim 10, wherein the attention content information specifying code is further configured to cause the at least one processor to specify new attention content information displayed on the display screen in case that a speed of the scrolling becomes smaller than or equal to a predetermined speed;

the control code is further configured to cause the at least one processor to cause the copy content information to be replaced with a copy of the new attention content information; and the transmitting code is further configured to cause the at least one processor to transmit the modified search result screen configured to display the copy of the new attention content information in the second layer within the scrollable region while displaying the attention content information in the first layer, which moves according to the detected scroll operation.

12. The information processing device according to claim 10, wherein a display form of the copy content information is changed according to a speed of the scrolling operation.

13. The information processing device according to claim 10, further comprising:

a distance information acquisition code is further configured to cause the at least one processor to acquire distance information indicating a distance from a display position of the attention content information on the display screen when the scroll operation is started to a display position of the attention content information whose position is changed according to the scroll operation, wherein the transmitting code is further configured to cause the at least one processor to transmit the modified search result screen configured to change a display form of the copy content information according to the distance indicated by the distance information acquired by the distance information acquisition code.

14. The information processing device according to claim 10, further comprising:

a time information acquisition code is further configured to cause the at least one processor to acquire time information indicating duration time of the scroll operation, wherein the transmitting code is further configured to cause the at least one processor to transmit the modified search result screen configured to change a display form of the copy content information according to the duration time indicated by the time information acquired by the time information acquisition code.

15. The information processing device according to claim 1, wherein the transmitting code is further configured to cause the at least one processor to transmit the modified search result screen configured to display the copy content information to be invisible in case that a speed of the scrolling operation becomes smaller than or equal to a predetermined speed.

16. The information processing device according to claim 1, wherein the attention content information specifying code is further configured to cause the at least one processor to specify new attention content information displayed on the display screen in case that a speed of the scrolling becomes smaller than or equal to a predetermined speed;

the control code is further configured to cause the at least one processor to cause the copy content information to be replaced with a copy of the new attention content information; and the transmitting code is further configured to cause the at least one processor to transmit the modified search result screen configured to display the copy of the new attention content information in the second layer within the scrollable region while displaying the attention content information in the first layer, which moves according to the detected scroll operation.

17. The information processing device according to claim 1, wherein a display form of the copy content information is changed according to a speed of the scrolling operation.

18. The information processing device according to claim 1, further comprising:

a distance information acquisition code is further configured to cause the at least one processor to acquire distance information indicating a distance from a display position of the attention content information on the display screen when the scroll operation is started to a display position of the attention content information whose position is changed according to the scroll operation, wherein the transmitting code is further configured to cause the at least one processor to transmit the modified search result screen configured to change a display form of the copy content information according to the distance indicated by the distance information acquired by the distance information acquisition code.

19. The information processing device according to claim 1, further comprising:

a time information acquisition code is further configured to cause the at least one processor to acquire time information indicating duration time of the scroll operation, wherein the transmitting code is further configured to cause the at least one processor to transmit the modified search result screen configured to change a display form of the copy content information according to the duration time indicated by the time information acquired by the time information acquisition code.

20. The information processing device according to claim 1, wherein a degree of transparency of the copy content information is changed according to a speed of scrolling in response to the scroll operation.

21. The information processing device according to claim 1, wherein the one item among the plurality of items in the list specified as the attention content information attention comprises a plurality of elements each representing a different feature of said one item.

22. The information processing device according to claim 1, wherein the attention content information specifying code being configured to cause the at least one processor to specify the one item among the plurality of items in the list as the attention content information comprises specifying a first item among the plurality of items in the list as a first attention content information and a second item among the plurality of items in the list as the second attention content information that are set in advance before the search result screen is transmitted by the transmitting code, as plurality of content information to which the user is caused to pay attention.

23. An information processing method performed by a computer that causes content information to be displayed on a display screen of a terminal device, the information processing method comprising:

receiving a search keyword from the terminal device;

generating a digital content data file based on a search result using the search keyword, the digital content data file including a list of a plurality of items corresponding to the search keyword in a sorted state according to a sorting condition; transmitting to the terminal device a search result screen configured to display the digital content data file as content information in a first layer of a scrollable region of a display screen of a display of the terminal device;

specifying one item among the plurality of items in the list as attention content information that is set in advance before the search result screen is transmitted, as content information to which a user is caused to pay attention;

determining whether a scroll operation is detected which causes the attention content information on the display of the terminal device to be scrolled in the scrollable region of a display screen of a display of the terminal;

copying the specified attention content information as copy content information; and in response to determining the scroll operation is detected, generating a modified search result screen configured to display the copy content information in a second layer superimposed over at least one of the plurality of items in the first layer within the scrollable region while displaying the attention content information in the first layer, wherein the copy content information is displayed in the search result screen in a sorted manner, along with information indicating the ranking of the plurality of items in the sorted state, wherein the attention content information in the first layer moves from a first location to a second location according to the detected scroll operation, while the copy content information in the second layer of the scrollable region is moved from the same first location to the same second location, at a speed slower than a speed of the attention content information in the first layer in the same direction, and wherein the copy information remains on the search result screen even after the attention content is scrolled out of the search result screen.

24. An information processing device that causes content information to be displayed on a display of a terminal device, the information processing device comprising: at least one non-transitory memory operable to store program code;

at least one processor operable to read said program code and configured to operate as instructed by said program code, said program code including:

transmitting code configured to cause at the at least one processor to transmit to the terminal device a display screen data configured to display a Web page data file including a list of a plurality of items as content information in a first layer of a scrollable region of a display screen of a display of the terminal;

attention content information specifying code configured to cause the at least one processor to specify one item among the plurality of items in the list as attention content information that is set in advance before the display screen data is transmitted by the transmitting code, as content information to which a user is caused to pay attention;

detecting code configured to cause the at least one processor to determine whether a scroll operation is detected which causes the attention content information on the display of the terminal device to be scrolled in the scrollable region of the display screen; and control code configured to cause the at least one processor to copy the specified attention content information as copy content information, wherein, in response to determining the scroll operation is detected, the transmitting code is further configured to cause at the at least one processor to transmit a modified display screen data configured to display the copy content information in a second layer superimposed over at least one of the plurality of items in the first layer within the scrollable region while displaying the attention content information in the first layer, wherein the attention content information in the first layer moves from a first location to a second location according to the detected scroll operation, while the copy content information in the second layer of the scrollable region is moved from the same first location to the same second location, at a speed slower than a speed of the attention content information in the first layer in the same direction, wherein the copy content information moves in a zigzag manner, and wherein the copy information remains on the search result screen even after the attention content is scrolled out of the search result screen.

* * * * *